United States Patent [19]
Kurtze et al.

[11] Patent Number: 6,105,083
[45] Date of Patent: Aug. 15, 2000

[54] APPARATUS AND METHOD FOR CONTROLLING TRANSFER OF DATA BETWEEN AND PROCESSING OF DATA BY INTERCONNECTED DATA PROCESSING ELEMENTS

[75] Inventors: Jeffrey D. Kurtze, Nashua, N.H.; Craig R. Frink, Chelmsford, Mass.; James Hamilton, Redwood City, Calif.; Frank C. Sarnowski, Woburn; Raymond D. Cacciatore, Westford, both of Mass.; Scott A. Markinson, Goffstown, N.H.; Michael F. Lamenza, Boston, Mass.; Anthony O'Connor, Westford; Hamed Eshraghian, Lexington, both of Mass.

[73] Assignee: Avid Technology, Inc., Tewksbury, Mass.

[21] Appl. No.: 08/879,981

[22] Filed: Jun. 20, 1997

[51] Int. Cl.[7] .............................. G06F 13/42; H04N 7/24
[52] U.S. Cl. ................................ 710/29; 710/34; 710/59; 710/106
[58] Field of Search ................................ 395/821, 853, 395/854, 855, 872; 364/137, 131, 130; 382/304; 710/29, 34, 58, 59, 105, 106; 712/28.29

[56] References Cited

U.S. PATENT DOCUMENTS

| | | | |
|---|---|---|---|
| 2,927,154 | 3/1960 | Wolfe et al. | 178/606 |
| 3,084,215 | 4/1963 | Bounsall | 178/6.6 |
| 3,123,668 | 3/1964 | Silva | 178/6.8 |
| 3,342,949 | 9/1967 | Wessels | 179/100.2 |

(List continued on next page.)

FOREIGN PATENT DOCUMENTS

| | | |
|---|---|---|
| 0 113 993 B1 | 7/1984 | European Pat. Off. . |
| 0 268 270 B1 | 5/1988 | European Pat. Off. . |
| 0 336 712 A2 | 10/1989 | European Pat. Off. . |
| 0 339 948 B1 | 11/1989 | European Pat. Off. . |

(List continued on next page.)

OTHER PUBLICATIONS

Chang, Shih–Fu, et al., A New Approach to Decoding and Composiitng Motion–Compensated DCT–Based Images, ICASSP '93, Minneapolis, Minnesota, Apr., 1993.

Chang, Shih–Fu, et al., Compositing Motion–Compensated Video within the Network, IEEE 4th Workshop on Multimedia Communication, Monterey, California, Apr. 1992.

Shiu, J., A Low–Cost Editor for MPEG–1: Systems Streams, Aug. 1995 IEEE Transactions Counsumer Electronics, vol. 41, No. 3, pp. 620–625.

(List continued on next page.)

*Primary Examiner*—Thomas C. Lee
*Assistant Examiner*—Iiwoo Park
*Attorney, Agent, or Firm*—Wolf, Greenfield & Sacks, P.C.

[57] ABSTRACT

The present invention provides a generic interface which enables asynchronous data processing elements to be interconnected using an interconnection protocol that controls flow of data between the processing elements. The flow control allows the processing elements to be data independent from, i.e., the processing elements need not be designed for a fixed sample rate or resolution, sample format and other data dependent factors. When used with digital motion video data, the processing elements may process motion video data at various temporal and spatial resolutions and color formats. Flow of data between processing elements may be controlled by handshake signals indicating whether the sender has valid data and the receiver can receive data. When valid data is available at the sender and is requested by the receiver, a transfer of data occurs. The characteristics of the data, and functions to be performed on the data may be specified using control inputs to the processing elements. A counting circuit may be used to specify the number of the data samples for which the control inputs are valid. The interface allows each processing element to have a small number of storage locations for storing data, such as a pair of registers, which eliminates the need for large buffers and simplifies implementation of the processing element with such flow control as a simple integrated circuit.

60 Claims, 18 Drawing Sheets

U.S. PATENT DOCUMENTS

| | | | |
|---|---|---|---|
| 3,721,757 | 3/1973 | Ettlinger | 178/6.6 A |
| 3,740,463 | 6/1973 | Youngstrom et al. | 178/6.6 A |
| 3,748,381 | 7/1973 | Strobele et al. | 178/6.6 A |
| 3,787,617 | 1/1974 | Fiori | 179/100.2 |
| 3,824,336 | 7/1974 | Gould et al. | 178/6.8 |
| 3,925,815 | 12/1975 | Lemelson | 360/14 |
| 4,001,882 | 1/1977 | Fiori et al. | 360/14 |
| 4,080,626 | 3/1978 | Hurst et al. | 358/160 |
| 4,100,607 | 7/1978 | Skinner | 364/900 |
| 4,149,242 | 4/1979 | Pirz | 711/5 |
| 4,205,346 | 5/1980 | Ross | 348/722 X |
| 4,209,843 | 6/1980 | Hyatt | 364/728.03 |
| 4,272,790 | 6/1981 | Bates | 360/14 |
| 4,283,745 | 8/1981 | Kuper et al. | 360/13 |
| 4,311,998 | 1/1982 | Matherat | 345/127 |
| 4,363,049 | 12/1982 | Ohtsuki et al. | 360/13 |
| 4,375,083 | 2/1983 | Maxemchuck | 364/900 |
| 4,538,188 | 8/1985 | Barker et al. | 360/14.1 |
| 4,541,008 | 9/1985 | Fishman et al. | 358/13 |
| 4,550,437 | 10/1985 | Kobayashi et al. | 382/304 |
| 4,558,302 | 12/1985 | Welch | 340/347 |
| 4,602,286 | 7/1986 | Kellar et al. | 358/183 |
| 4,612,569 | 9/1986 | Ichinose | 348/588 |
| 4,663,730 | 5/1987 | Ikeda | 364/140.06 |
| 4,685,003 | 8/1987 | Westland | 360/14.1 |
| 4,694,343 | 9/1987 | Flora | 358/183 |
| 4,698,664 | 10/1987 | Nichols et al. | 358/10 |
| 4,698,682 | 10/1987 | Astle | 358/182 |
| 4,717,971 | 1/1988 | Sawyer | 358/342 |
| 4,746,994 | 5/1988 | Ettlinger | 360/13 |
| 4,750,050 | 6/1988 | Belmare-Sarabia et al. | 358/311 |
| 4,785,349 | 11/1988 | Keith et al. | 358/136 |
| 4,858,011 | 8/1989 | Jackson et al. | 358/181 |
| 4,937,685 | 6/1990 | Barker et al. | 360/14.1 |
| 4,956,725 | 9/1990 | Kozuki et al. | 360/14.3 |
| 4,964,004 | 10/1990 | Barker | 360/94 |
| 4,970,663 | 11/1990 | Bedell et al. | 364/521 |
| 4,972,274 | 11/1990 | Becker et al. | 360/14.1 |
| 4,979,050 | 12/1990 | Westland et al. | 360/14.1 |
| 4,991,013 | 2/1991 | Kobayashi | 358/183 |
| 4,994,914 | 2/1991 | Wiseman | 358/160 |
| 4,999,807 | 3/1991 | Akashi | 364/900 |
| 5,040,066 | 8/1991 | Arbeiter et al. | 358/183 |
| 5,045,940 | 9/1991 | Peters et al. | 358/143 |
| 5,048,012 | 9/1991 | Gulick et al. | 370/498 |
| 5,050,066 | 9/1991 | Myers et al. | 364/200 |
| 5,068,785 | 11/1991 | Sugiyama | 395/325 |
| 5,077,610 | 12/1991 | Searby et al. | 358/183 |
| 5,081,701 | 1/1992 | Silver | 395/325 |
| 5,109,482 | 4/1992 | Bohrman | 395/154 |
| 5,111,409 | 5/1992 | Gasper et al. | 395/152 |
| 5,119,441 | 6/1992 | Brown | 382/41 |
| 5,121,210 | 6/1992 | Hirayama | 358/183 |
| 5,126,851 | 6/1992 | Yoshimura et al. | 358/335 |
| 5,161,019 | 11/1992 | Emanuel | 358/183 |
| 5,164,839 | 11/1992 | Lang | 358/335 |
| 5,189,516 | 2/1993 | Angell et al. | 358/181 |
| 5,191,645 | 3/1993 | Carlucci et al. | 395/159 |
| 5,192,999 | 3/1993 | Graczyk et al. | 358/85 |
| 5,194,952 | 3/1993 | Pelley | 358/183 |
| 5,206,929 | 4/1993 | Langford et al. | 395/159 |
| 5,216,755 | 6/1993 | Walker et al. | 395/132 |
| 5,220,425 | 6/1993 | Enari et al. | 358/160 |
| 5,222,219 | 6/1993 | Stumpf et al. | 395/325 |
| 5,227,863 | 7/1993 | Bilbrey et al. | 358/22 |
| 5,237,567 | 8/1993 | Nay et al. | 370/438 |
| 5,237,648 | 8/1993 | Mills et al. | 395/133 |
| 5,241,389 | 8/1993 | Bilbrey | 358/181 |
| 5,243,447 | 9/1993 | Bodenkamp et al. | 345/133 |
| 5,255,373 | 10/1993 | Brockman et al. | 395/325 |
| 5,255,375 | 10/1993 | Crook et al. | 395/285 |
| 5,257,113 | 10/1993 | Chen et al. | 358/426 |
| 5,260,695 | 11/1993 | Gengler et al. | 345/153 |
| 5,267,351 | 11/1993 | Reber et al. | 395/600 |
| 5,274,750 | 12/1993 | Shiina et al. | 395/99 |
| 5,274,760 | 12/1993 | Schneider | 395/162 |
| 5,287,420 | 2/1994 | Barrett | 382/56 |
| 5,305,438 | 4/1994 | MacKay et al. | 395/164 |
| 5,315,326 | 5/1994 | Sugiyama | 348/415 |
| 5,315,390 | 5/1994 | Windrem | 348/584 |
| 5,321,500 | 6/1994 | Capitant et al. | 348/97 |
| 5,353,391 | 10/1994 | Cohen et al. | 395/125 |
| 5,373,327 | 12/1994 | McGee et al. | 348/645 |
| 5,388,197 | 2/1995 | Rayner | 395/154 |
| 5,410,354 | 4/1995 | Uz | 348/426 |
| 5,412,773 | 5/1995 | Carlucci et al. | 395/156 |
| 5,426,467 | 6/1995 | Moriwake et al. | 348/584 |
| 5,432,900 | 7/1995 | Rhodes et al. | 395/154 |
| 5,440,348 | 8/1995 | Peters et al. | 348/593 |
| 5,459,517 | 10/1995 | Kunitake et al. | 348/416 |
| 5,459,529 | 10/1995 | Searby et al. | 348/586 |
| 5,495,291 | 2/1996 | Adams | 348/390 |
| 5,499,050 | 3/1996 | Baldes et al. | 348/180 |
| 5,508,940 | 4/1996 | Rossmere et al. | 364/514 |
| 5,526,132 | 6/1996 | Tsubota et al. | 358/335 |
| 5,528,301 | 6/1996 | Hau et al. | 348/441 |
| 5,528,310 | 6/1996 | Peters et al. | 348/593 |
| 5,559,562 | 9/1996 | Ferster | 348/584 |
| 5,559,641 | 9/1996 | Kajimoto et al. | 360/14.1 |
| 5,577,190 | 11/1996 | Peters | 395/501 |
| 5,581,784 | 12/1996 | Tobagi et al. | 395/826 |
| 5,589,993 | 12/1996 | Naimpally | 386/81 |
| 5,623,308 | 4/1997 | Civanlar et al. | 348/392 |
| 5,638,501 | 6/1997 | Gough et al. | 395/135 |
| 5,642,174 | 6/1997 | Kazui et al. | 348/700 |
| 5,644,364 | 7/1997 | Kurtze et al. | 348/584 |
| 5,646,750 | 7/1997 | Collier | 358/518 |
| 5,647,047 | 7/1997 | Nagawawa | 386/52 |
| 5,654,737 | 8/1997 | Der et al. | 345/113 |
| 5,655,117 | 8/1997 | Goldberg et al. | 395/613 |
| 5,659,539 | 8/1997 | Porter et al. | 395/200.61 |
| 5,682,326 | 10/1997 | Klingler et al. | 364/514 |
| 5,684,543 | 11/1997 | Kobayashi | 348/705 |
| 5,732,239 | 3/1998 | Tobagi et al. | 395/441 |
| 5,754,186 | 5/1998 | Tam et al. | 345/435 |
| 5,768,447 | 6/1998 | Irani et al. | 382/305 |
| 5,883,670 | 3/1999 | Sporer et al. | 348/384 |
| 5,907,692 | 5/1999 | Wise et al. | 395/377 |
| 5,949,948 | 9/1999 | Krause et al. | 386/6 |

FOREIGN PATENT DOCUMENTS

| | | |
|---|---|---|
| 0 357 413 A2 | 9/1990 | European Pat. Off. . |
| 0 390 048 B1 | 10/1990 | European Pat. Off. . |
| 0 390 421 B1 | 10/1990 | European Pat. Off. . |
| 0 438 299 B1 | 7/1991 | European Pat. Off. . |
| 0 440 408 A1 | 8/1991 | European Pat. Off. . |
| 0 450 471 A2 | 10/1991 | European Pat. Off. . |
| 0 469 850 A2 | 2/1992 | European Pat. Off. . |
| 0 473 322 A1 | 3/1992 | European Pat. Off. . |
| 0 476 985 B1 | 3/1992 | European Pat. Off. . |
| 0 480 625 A2 | 4/1992 | European Pat. Off. . |
| 0 488 673 A2 | 6/1992 | European Pat. Off. . |
| 0 526 064 B1 | 2/1993 | European Pat. Off. . |
| 0 585 903 A2 | 3/1994 | European Pat. Off. . |
| 0 599 607 A1 | 6/1994 | European Pat. Off. . |
| 0 645 765 A1 | 3/1995 | European Pat. Off. . |
| 0 665 513 A2 | 8/1995 | European Pat. Off. . |
| 0 696 798 A1 | 2/1996 | European Pat. Off. . |
| 0 715 460 A1 | 6/1996 | European Pat. Off. . |

| | | |
|---|---|---|
| 0 725 399 A2 | 8/1996 | European Pat. Off. . |
| 4 121 315 | of 0000 | Germany . |
| 42 01 335 | 7/1993 | Germany . |
| 42 29 394 | 3/1994 | Germany . |
| 3-136480 | 6/1991 | Japan . |
| 3-289263 | 12/1991 | Japan . |
| 2 235 815 | 3/1991 | United Kingdom . |
| 2 260 458 | 4/1993 | United Kingdom . |
| WO 87/07108 | 11/1987 | WIPO . |
| WO 90/13879 | 11/1990 | WIPO . |
| WO 93/21636 | 10/1993 | WIPO . |
| WO 94/24815 | 10/1994 | WIPO . |
| WO 97/19552 | 5/1997 | WIPO . |
| WO 97/41684 | 11/1997 | WIPO . |
| WO 98/59494 | 12/1998 | WIPO . |

OTHER PUBLICATIONS

Shae, Z.–Y. and Chen, M.–S., Mixing and Playback of JPEG Compressed Packet Videos, Proceedings IEEE Globecom '92 Conference, pp. 245–249, Dec. 6, 1992.

Weiss, S.M., Switching Facilities in MPEG–2: Necessary But Not Sufficient, Dec. 1995, SMPTE Journal, vol. 104, No. 12, pp. 788–802.

Hedtke, S., et al., Schnittbearbeitung Von MPEG–2: Codierten Videosequenzen, Jul. 1996, Fernseh–Und Kino–Technik vol. 50, No. 7, pp. 367–373.

Saraiya, A, et al., Encoding Solutions for MPEG Systems, Wescon '95 Conference Record, Nov. 1995, pp. 732–737.

Rangan, P. V., Continuity and Synchronization in MPEG, Jan. 1996, IEEE Journal on Selected Areas in Communications, vol. 14, No. 1, pp. 52–60.

Davidoff, Frank, The All–Digital Television Studio, SMPTE Journal, vol. 89, No. 6 Jun. 1980, pp. 445–449.

Haeberli, Paul and Akeley, Kurt, The Accumulation Buffer: Hardware Support for High–Quality Rendering, Computer Graphics, vol. 24, No. 4, Aug. 1990.

Smith, B.C. and Rowe, L.A., Algorithms for Manipulating Compressed Images, IEEE Computer Graphics and Applications, vol. 13, Issue 5, pp. 34–42, Sep. 1993.

C.A. Pantuso, Reducing Financial Aliasing in HDTV Production, Better Video Images, 23rd Annual SMPTE Conference, Feb. 3–4, 1989, San Francisco, CA. pp. 157–169.

Rangan, P.V. et al, A Window–Based Editor for Digital Video and Audio, 1992, pp. 640–648 IEEE.

Mackay, W.E. and Davenport, G., Virtual Video Editing in Interactive Multimedia Applications Jul. 1989, pp. 802–810, vol. 32, No. 7, Comm of ACM.

Krieg, P., Multimedial–Computer und die Zukunft des Film/Videoschnitts, 1991, pp. 252–258, Fernseh–und Kino–Technik Norton, M.J., A Visual EDL System (The German document entitled "Multimedia–Computer und die Zukunft des Film/Videoschnitts" by Krieg describes the EMC2 and Avid video editing systems as they existed before the time of the pulbication of the German document).

Green, J.L., The Evolution of DVI System Software, Jan. 1992, pp. 53–57, vol. 35, No. 1, Comm of ACM.

The O.L.E. Partnership, Lightworks Editor (Advertisement).

Fronczak, D., et al., Motion JPEG and MPEG Solutions for Multimedia, Nov. 1995, Wescon '95 Conference Record, pp. 738–742.

New Image Acquisition Ic for PC Video Capture use, Electronic Engineering, vol. 67, No. 818 Feb. 1995, one page.

Willner, R., Transforming the PC into a TV, Radio, VCR and Video Editing Studio, Nov. 1995 Wescon '95 Conference Record pp. 743–748.

Kroeker, E.J. Challenges in Full Motion Video/Audio for Personal Computers, Jan. 1993 SMPTE Journal, vol. 102, No. 1, pp. 24–31.

The Analog Devices Product literature on a ADV601 Codec and an ADV7175 encoder (1996).

www.techweb.com/se/directlink.cgi?EET19960610S0144 EETIMES, Issue:905 (Jun. 10, 1996).

www.techweb.com/se/directlink.cig?EET19960527S0016 EETIMES Issue:903 (May 27, 1996).

Vicki de Mey and Simon Gibbs, "A Multimedia Component Kit," Experiences with Visual Composition of Applications Centre Universitaire d'Informatique, Université de Genève.

Michael Kass, "CONDOR: Constraint–Based Dataflow," Computer Graphics, 26, Jul. 2, 1992.

Ulrich Schmidt and Knut Caesar, "Datawave: A Single–Chip Multiprocessor for Video Applications," 1991 IEE Micro, vol. 11, Jun. 1991.

J. Serot G. Quenot and B. Zavidovique and B. Zavidovique, "Functional Data–flow Architecture dedicated to Real–time Image Processing," IFIP WG10.3 Working Conference, pp. 129–140, 1993.

APPARATUS AND METHOD FOR CONTROLLING TRANSFER OF DATA BETWEEN AND PROCESSING OF DATA BY INTERCONNECTED DATA PROCESSING ELEMENTS

FIELD OF THE INVENTION

The present invention is related to apparatus and methods for controlling transfer and processing of data by interconnected data processing elements. The invention is more particularly related to the processing of temporally continuous media data, including motion video and audio data.

BACKGROUND OF THE INVENTION

Analog motion video signals, such as those used in common television sets, video tape recorders and other analog video systems, are temporally continuous and synchronous signals requiring various elements in a video system to be synchronized in order to be used. In other words, analog motion video signals have a predetermined and fixed rate to which all of the elements in the video system are synchronized. Any element in the video system is designed with the assumption that there will be a constant rate for input and output of motion video information.

More recently, it has been possible to store digital motion video data in data files on a computer. There are several methods for playing back such motion video data. One method is called "pushing" or "streaming" of the motion video data. Streaming is based on an assumption that a system can provide an average data flow rate that is the same as the ultimate data flow rate needed to ensure temporally continuous output of analog motion video images to a viewer. Sufficient buffering is used to account for expected latencies in data transfer between elements. In some cases, both the temporal and spatial resolution of the motion video information may need to be reduced. Such systems typically are designed with the assumption that transfer of audio and video data from a source through several processing elements to its ultimate destination can neither be delayed nor stopped.

When a general purpose digital computer is used to process motion video information, a constant rate of flow of data generally cannot be maintained. There may be variations in data flow rates due to various latencies in the computer system due to, for example, disk or memory read latency, interrupts from other processing elements in the computer, etc. In addition, in some systems, such as editing systems, the ability to stop and restart playback is desirable. In order to overcome such problems, one method which has been used is to provide sufficient buffering in combination with an ability for data transfer to be stalled, such as shown in U.S. Pat. No. 5,045,940 (Peters, et al.) which is hereby incorporated by reference. These principles are used in a computer network as described in published European Patent Application No. 0674414A2. An extension of this combination to special effects processing is disclosed in PCT Publications WO94/24815 and WO95/26100 which are incorporated by reference. In this system, a data decompressor outputs data into a first buffer, from which it is transferred to a second buffer associated with a special effects processor. The first buffer indicates whether valid data is available. In addition, the special effects processor indicates to a controller associated with the decompressor whether it can receive data based on memory in the second buffer. One drawback of all of these systems is that they require a significant amount of buffering to accommodate for delays in data transfer between elements. In addition, they are designed for use with a single predetermined format of media.

SUMMARY OF THE INVENTION

The present invention provides a generic interface which enables asynchronous data processing elements to be interconnected using an interconnection protocol that controls flow of data between the processing elements. The flow control allows the processing elements to be data independent from, i.e., the processing elements need not be designed for a fixed sample rate or resolution, sample format and other data dependent factors. When used with digital motion video data, the processing elements may process motion video data at various temporal and spatial resolutions and color formats. Flow of data between processing elements may be controlled by handshake signals indicating whether the sender has valid data and the receiver can receive data. When valid data is available at the sender and is requested by the receiver, a transfer of data occurs. The characteristics of the data, and functions to be performed on the data may be specified using control inputs to the processing elements. A counting circuit may be used to specify the number of the data samples for which the control inputs are valid. The interface allows each processing element to have a small number of storage locations for storing data, such as a pair of registers, which eliminates the need for large buffers and simplifies implementation of the processing element with such flow control as a simple integrated circuit.

Accordingly one aspect of the present invention is an output interface for a sender of data. The interface includes an output including data lines for carrying a datum and a boundary signal line for carrying a signal indicating whether the datum defines a boundary of a sample of the data. A valid data signal output line carries a valid data signal associated with a datum which indicates whether the associated datum is valid. A request signal input line carries a request signal from a receiver associated with a datum from the sender which indicates a request for transfer of the associated datum. The interface includes a handshake mechanism which is operative on an edge of an interface clock signal to hold a datum at the sender when either of the request signal or valid data signal associated with the datum are not asserted and to permit transfer of the datum to the receiver through the output when both the request signal and the valid data signal associated with the datum are asserted. In one embodiment, the handshake mechanism is operative on an edge of the interface clock signal to hold the datum on the output when either of the request signal or valid data signal are not asserted and to permit update of the datum on the output when both the request signal and the valid data signal are asserted.

Another aspect of the present invention is an input interface for a receiver of data. The interface has an input, including data lines for carrying a datum and a boundary signal line for carrying a signal indicating whether the datum on the data lines defines a boundary of a sample of the data. A valid data signal input line carries a valid data signal associated with a datum from a sender and indicating whether the associated datum is valid. A request signal output line carries a request signal and associated with a datum from the sender and indicating a request for transfer of the associated datum. Data flow is controlled by a handshake mechanism which is operative on an edge of the interface clock signal to accept a datum received through the input when both the request signal and the valid data signal associated with the datum are asserted and not to accept a datum received through the input when either the request signal or the valid data signal associated with the datum are not asserted. In one embodiment, the handshake mechanism does not read the datum on the input when either of the request signal or valid data signal are not asserted and reads the datum on the input when both the request signal and the valid data signal are asserted.

Another aspect of the present invention is an integrated circuit with a processing section having an input for receiving data and an output providing processed data. The integrated circuit has an input interface as described above with an output connected to the input of the processing section. The integrated circuit has an output interface with an input connected to the output of the processing section. Input logic is operative on an edge of an interface clock signal to accept a datum received through the input when both the first request signal and the first valid data signal associated with the datum are asserted and for not to accept a datum received through the input when either the first request signal or the first valid data signal associated with the datum are not asserted. Output logic is operative on an edge of a clock signal to hold a datum when either of the second request signal or second valid data signal associated with the datum are not asserted and to permit transfer of the datum to the receiver through the output when both the second request signal and the second valid data signal associated with the datum are asserted.

Another aspect of the invention is a circuit for processing data, comprising a processing element having a first input for receiving data comprised of a plurality of samples, a second input for receiving control information indicating how the received data is to be processed, a third input for receiving a control signal for starting and stopping processing by the processing element and an output providing processed data. A counting circuit has a first input for receiving a value to be loaded to provide an output, wherein the output indicates a number of samples of the processed data for which the control information is valid. Control logic tracks a number of samples processed by the processing element and generates the control signal to the processing element after the processing element outputs the last sample for which the control information is valid. In one embodiment, the processing element includes a plurality of interconnected processors.

Another aspect of the invention is a circuit for processing data, comprising a first processing element having a first input for receiving data comprised of a plurality of samples, a second input for receiving control information indicating how the received data is to be processed, a third input for receiving a control signal for starting and stopping processing by the first processing element and an output providing processed data. A second processing element has a first input connected to the output of the first processing element and for receiving the processed data comprised of a plurality of samples, a second input which receives control information indicating how the received data is to be processed, a third input for receiving the control signal for starting and stopping processing by the second processing element and an output providing processed data. A counting circuit has a first input for receiving a value to be loaded to provide an output, wherein the output indicates a number of samples of the processed data for which the control information is valid. Control logic tracks a number of samples processed by the second processing element and generates the control signal to the first and second processing elements after the second processing element outputs the last sample for which the control information is valid.

DETAILED DESCRIPTION

The present invention will be more completely understood through the following detailed description which should be read in conjunction with the attached drawing in which similar reference numbers indicate similar structures.

The present invention provides an asynchronous data interface for interconnecting processing elements in a manner which allows the processing elements to be data independent. For example, for digital motion video data the interconnect allows for format independence, temporal and spatial resolution independence, frame rate independence and variability, and faster than real-time transfer of compressed or uncompressed digital motion video data between processing elements. In general, the interface allows processing elements to treat media as computed data rather than temporally continuous data. Because of the data independence of the interconnect and subsequently the processing performed by interconnected processing elements, different formats of data and different media types may be multiplexed with different bandwidths across the same interconnect. The present invention eliminates an assumption that motion video data and audio data cannot be burst across an interconnect.

As a result, motion video data can be processed using the present invention with processing elements that allow for multiple temporal and spatial resolutions, color and pixel representations and resolutions, full motion and less than full motion video, broadcast quality and less than broadcast quality video data, and multiplexing of two or more data streams including video data, key data, other kinds of data and control information and data over the same interconnect.

Figure 1:
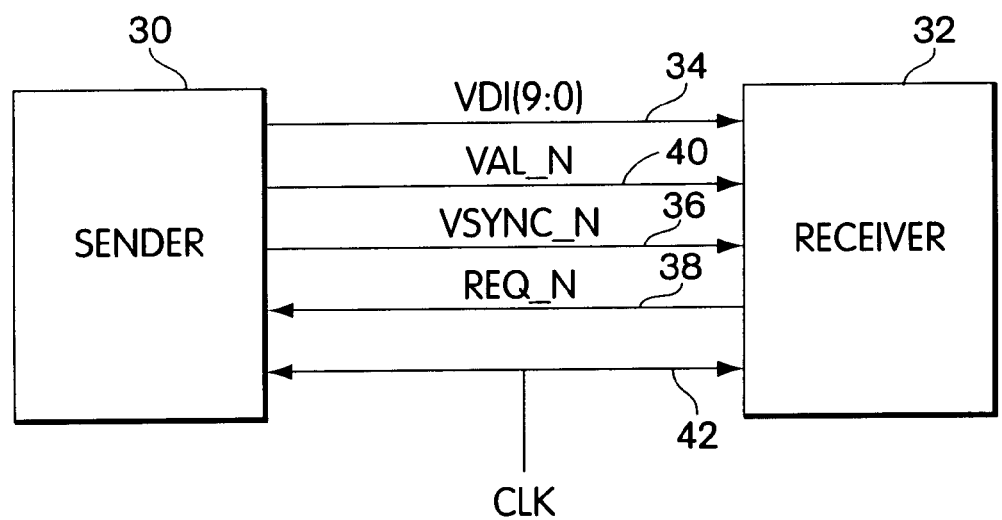
FIG. 1 is an illustration of the signals connecting two asynchronous video processing elements in an interface according to one embodiment of the present invention.

FIG. 1 illustrates an interface between a sender and a receiver of data. Each of the sender and the receiver may be implemented as separate integrated circuits. A sender 30 is connected to a receiver 32 through a data interconnect 34 that carries data (VDI(9:0)) between devices. While this embodiment is described in connection with video data it may be applied to other kinds of data. Such data includes, but is not limited to video data, key data, audio data, control information or other data. The data type may be agreed upon, by convention or by signals labeled in the data stream or specified by control information. The interface is unidirectional, but the direction may be selectable under appropriate software and/or hardware control, as discussed below. Transaction timing on this video data interface is relative to an edge, e.g., the rising edge, the falling edge or both, of the interface clock (CLK), e.g., a twenty-seven megahertz (27 MHZ) clock present on a signal line 42. The interface clock may be established by either an external source or by the sender, e.g., when source synchronous clocking is used to transmit data over long distances.

The width, in bits, of the data interconnect 34 of the interface depends on the application. For motion video data, both 8-bit and 10-bit data paths are suitable. In such an embodiment, the interface may be a single video component in width, according to an appropriate video format convention. For example, chroma and luma samples alternating on successive clocks following a 4:2:2 convention (CCIR601) may be supported. Other possible formats include, but are not limited to, RGB, 4:4:4, RGBA, 4×4 and 4:2:2:4. In general, the interface is format independent so long as the sender and receiver agree to the selected format. When a 10-bit interface is used for 8-bit only video data, the least significant bits (VDI 1:0) may be left undefined.

The flow of data from the sender 30 to the receiver 32 across the data interconnect 34 is controlled using two handshake signals. The first handshake signal is a request signal (REQ_N) sent across a signal line 38 from the receiver. The request signal is generated by the receiver and is associated with a datum at the sender which the receiver requests to be transferred. The receiver uses the request signal to indicate its ability to accept new data, which also allows the receiver to pace the flow of data. The request signal also may be asserted by the receiver independent of the second handshake signal, called the valid data signal. The valid data signal (VAL_N) is sent across a signal line 40 from the sender. The valid data signal is associated with a datum at the sender and indicates whether the associated datum is available to be transferred. The valid data signal may be asserted by the sender independent of the request signal. The sender uses the valid data signal to control the flow of information to the receiver.

The handshake mechanism from the point of view of the sender is the following. Upon each edge of an interface clock signal, the request signal and valid data signal associated with a datum available to be transferred are examined. If either signal is not asserted, the datum is held at the sender. If both handshake signals are asserted, then the transfer of the datum to the receiver through the output is permitted.

The handshake mechanism from the point of view of the receiver is the following. Upon each edge of the interface clock signal, the request signal and the valid data signal associated with a particular datum available at the sender to be transferred are examined. If either signal is not asserted, the datum is not accepted to be received through the input. When both the request signal and the valid data signal associated with the datum are asserted the datum is accepted to be received through the input.

In one embodiment, the valid data signal is used to indicate that valid data is present on the data interface 34. The request signal is used to indicate that the data present on the data interface 34 is requested by the receiver. A transfer of data across the interconnect 34 occurs if both the request signal and valid data signal are asserted when an edge of the interface clock occurs and the data on the data interface 34 is updated. If either signal is negated, then the data transfer does not occur, the data is stored at the sender and the flow of information between the devices is stalled. Suspending data transfer may be effected by suspending the clock controlling latches on the interface or by appropriate feedback circuitry. In other embodiments, to be described below, the request signal and valid data signals may be pipelined or delayed or may be assumed to be valid for a plurality of data to be transferred.

A boundary signal (VSYNC_N), sent by the sender across a signal line 36 with the data to the receiver, represents auxiliary information about the data transferred across the interface. This signal may include one or more bits of information. This boundary signal signifies at least the boundary of data for a given sample. For example, for motion video data the boundary signal may designate an image boundary, or another boundary such as a line or pixel or video datum. When used to designate an image boundary, this signal may be asserted at the same time the data for the last component of either a pixel in the image or a key is on the data interconnect 34 in order to indicate the end of the image. The start of data for a sample, such as an image, could be signaled instead of the end. The boundary signal also may be encoded such that a transition in the signal designates an end of field and the state of the signal on the first component of the field indicates the sense (i.e., odd or even) of the field. The auxiliary information also may indicate the presence of data type or other control information. The boundary signal is asserted with the same timing as the data on the data interconnect 34 and follows the same flow control behavior as the data. It is valid also only when the valid data signal is asserted. If the request signal is negated at the time when the boundary signal is asserted, then the boundary signal remains valid as long as the valid data signal is asserted.

Figure 2A:
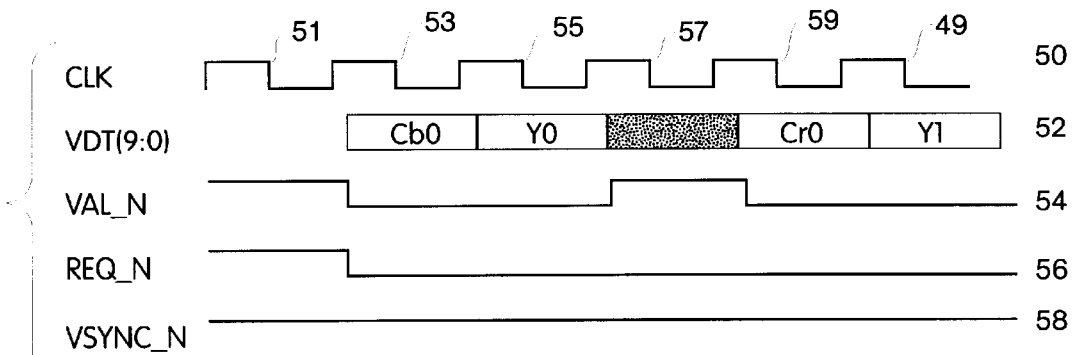
FIGS. 2A–2F are timing diagrams illustrating the relationship of signals across the interface of FIG. 1.

Referring now to FIG. 2A, a timing diagram illustrating control of flow of data by the sender using the valid data signal in one embodiment of the invention will now be described. In this example and in those to follow, the request signal (REQ_N), the valid data signal (VAL_N) and the boundary signal (VSYNC_N) are negative logic signals. The valid data signal 54, when asserted, indicates that the sender has placed either valid video data or valid key data 52 on the data interconnect 34. Data is read from the data interconnect 34 by the receiver when both the request signal 56 and the valid data signal 54 are asserted in the same cycle of the interface clock 50. When the valid data signal 54 is not asserted, no valid data exists on the video data interconnect. To simplify illustration, the boundary signal 58 is not asserted. The valid data signal for several clock cycles is shown at 54. Valid data is present at the video data interconnect 52 only when the valid data signal is asserted (cycles 53, 55, 59 and 49). In this example, it is assumed that the request signal, indicated at 56, is asserted for the second and subsequent clock cycles 53, 55, 57, 59 and 49. In this example, data transfer occurs only during clock cycles 53, 55, 59 and 49.

Figure 2B:
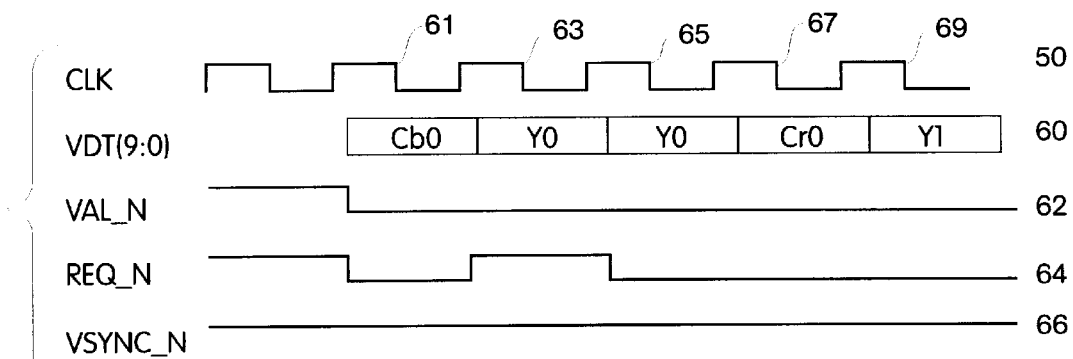

A timing diagram illustrating control of flow of data by the receiver using the request signal in one embodiment of the invention will now be described in connection with FIG. 2B. The request signal (REQ_N) indicates whether the receiver is able to accept data from the data interconnect. Data is read from the data interconnect when both the request signal and valid data signal are asserted in the same cycle of the interface clock. When the request signal is not asserted, the receiver is unable to read data from the data interconnect. In the timing diagram in FIG. 2B, a clock signal 50 represents the interface clock applied to the clock inputs of the sender and receiver. Data are shown at 60. The boundary signal 66 is not asserted for simplicity. The valid data signal (VAL_N) is shown at 62 and in this example is constantly asserted. Accordingly, valid data is always available on the data interconnect as illustrated at 60 for clock cycles 61, 63, 65, 67 and 69. The request data signal 64 is initially not asserted, then is asserted for one clock cycle 61, then not asserted for a clock cycle 63, then asserted for three clock cycles. For any clock cycle in which the request signal is not asserted (i.e., cycle 63), in the subsequent clock cycle (i.e., cycle 65), the data 60 available on the data interconnect does not change.

Figure 2C:
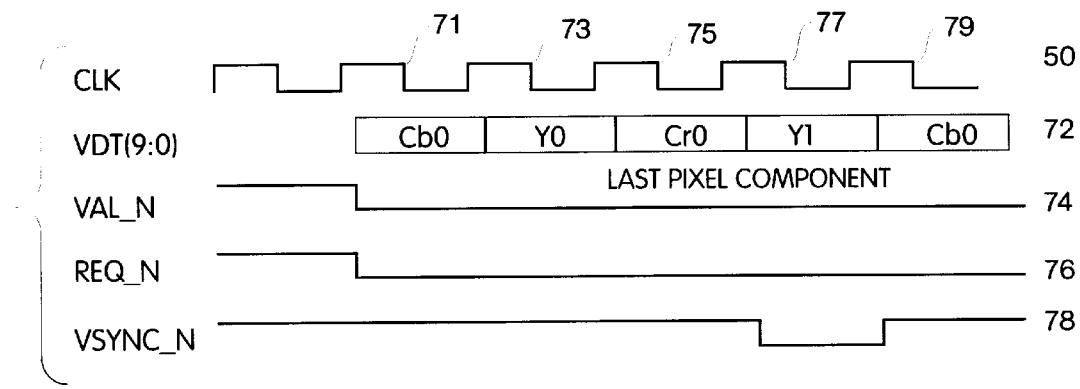

FIG. 2C is a timing diagram representing how the boundary signal is used to indicate the last component of a sample. In this example, the boundary signal represents a field boundary (called a vertical synchronization signal is a synchronous video system). The data on the data interconnect is illustrated at 72. Both the valid data signal (VAL_N) and the request signal (REQ_N) are asserted as shown at 74 and 76, respectively. As indicated at 78, at the fifth clock cycle 77, the data on the data interconnect is a component "y1," and is the last pixel component of the last pixel of a field. The assertion of the boundary signal as indicated in 78 is concurrent with the presentation of this last pixel component on the data interconnect. The boundary signals also may be used to designate other boundaries of other kinds of samples, such as a line or pixel, in the data.

This interface and these handshake signals allow transfer of a variety of types of data between processing elements in a time multiplexed manner. Timing diagrams FIGS. 2D through 2F illustrate some examples of the ordering of some formats of video data and key data in one embodiment of the invention.

Video component ordering may follow any standard convention, such as CCIR656 4:2:2, as follows (time advances left to right, left component first):

Cb0, Y0, Cr0, Y1, Cb2, Y2, Cr2, Y3, . . .
→

Figure 2D:
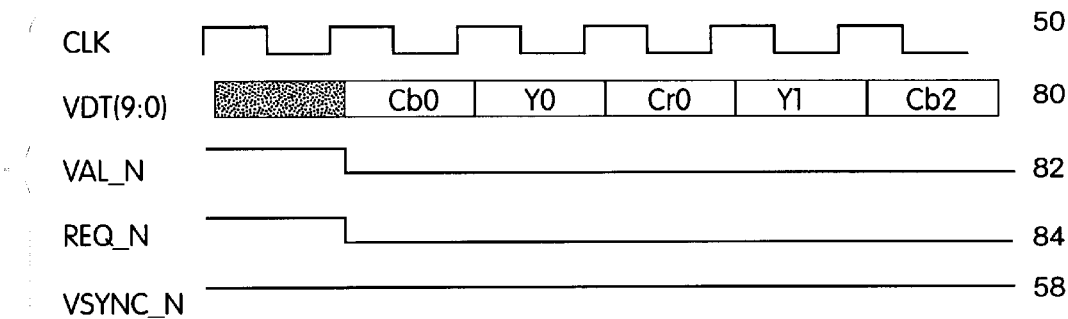
Figure 2E:
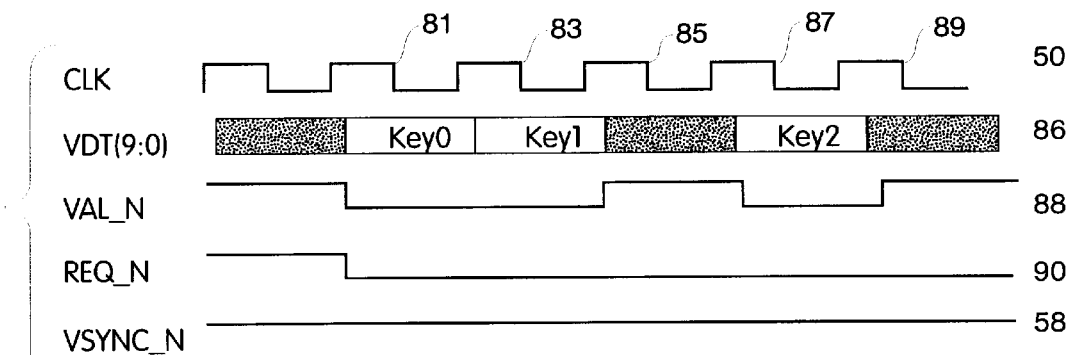
Figure 2F:
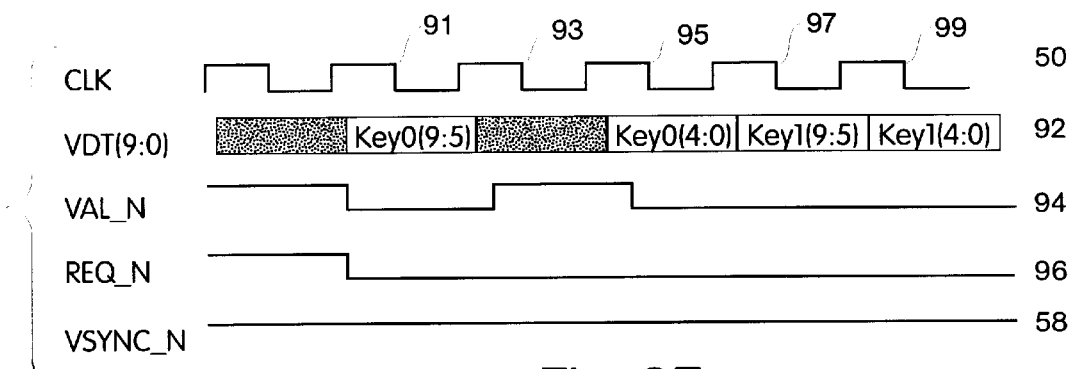

FIG. 2D is a timing diagram illustrating video component ordering. The interface clock signal and boundary signal are illustrated at 50 and 58, respectively. The boundary signal is not asserted. The video data illustrated at 80 illustrates components appearing in the sequence according to a 4:2:2 format. The valid data signal 82 and request data signal 84 are both asserted.

Since the interface is generic in nature, it also may be used to transport key data (e.g., alpha data for alpha compositing) separately from the video data. The interconnect may be used full width or half width in a time multiplexed manner, since the key data consumes only half the interconnection bandwidth in most video applications. Key values are ordered according to corresponding video samples, although a fixed timing relationship is not required at the interconnect. Full width key data occupies the full width of the interconnect, but only half its bandwidth. The ordering is shown below.

Key0, Key1, Key2, . . .
→

FIG. 2E is a timing diagram illustrating key component ordering. The data output by the element is illustrated at 86. It is assumed that the request signal 90 is asserted. As the valid data signal becomes unasserted in the fourth clock cycle 85 and sixth clock cycle 89, no data is available on the video data interface as indicated at 86. Note that the ordering of the data between the third and fifth clock cycles (83 and 87) does not involve any loss of data.

The interface may also be used in a time multiplexed fashion to transfer key data. A 10-bit key value may be transferred using half the interconnect width (5-bits). 10-bit values also can be time-multiplexed onto an 8-bit bus. This reduces the interface pin count by time multiplexing the key data into upper and lower time slices. The upper or most significant data is sent first followed by the lower or least significant data. When an 8-bit key is used the least significant bit (VDI0) is undefined. Key order is defined (left to right, left first) as:

Key0(high), Key0(low), Key1(high), Key1(low), . . .
→

FIG. 2F is a timing diagram illustrating multiplexed key component ordering. The key components appear at the video data interconnect as indicated at 92. It is assumed that the request data signal is constantly asserted as shown at 96. The valid data signal controls the output on the video data interface as indicated at 94. For example, in the third clock cycle 93, where the valid data signal is not asserted, the data present on the interface as indicated at 92 is held until the next clock cycle 95.

As stated above, multiple types of data may be multiplexed over the same interconnect, including two or more data streams of video data, key data, and other kinds of data and control information. When multiplexing two types of data, each type of data may have its own associated handshake signals. These handshake signals also can be multiplexed over the interconnect. Alternatively, separate interface signals may be provided for the two or more data streams which are multiplexed over the interconnect.

Having now described how transfer of data between processing elements is controlled and how various data types may be multiplexed across a data interconnect, control of processing performed by interconnected processing elements will now be described.

Since there are many possible types and formats of data that can be received by a processing element using this information, and since various functions can be performed on the data, a processing element receives control information about the data and the function to be performed. This control information should change only on sample boundaries. Such control information may include, for motion video data, the size of an image, i.e., its spatial resolution; a position of an image, e.g., for a processing element that is a picture-in-picture processor; brightness; contrast; color correction or other processing information; chroma or luma keys, indications of a blend to be performed; and/or possibly an indication of temporal resolution (i.e., frame rate) or color format. Such control information typically is provided by a host computer or local processor to the processing element so that it is available when the associated video information is available to be processed by the processing element.

Control information may be shared by several interconnected processing elements. In order for the processing element to receive correct control information, a control circuit is used to keep track of the number of samples processed by the processing element. The control information may be specified to be valid for a number of samples.

Processing elements interconnected in this manner operate in separate time domains since they are not "slaved" to a master clock. Each processing element, although closely related in time, provides control and state information to the host computer or other controller, so that the host may control and track progress of the processing element.

Figure 3A:
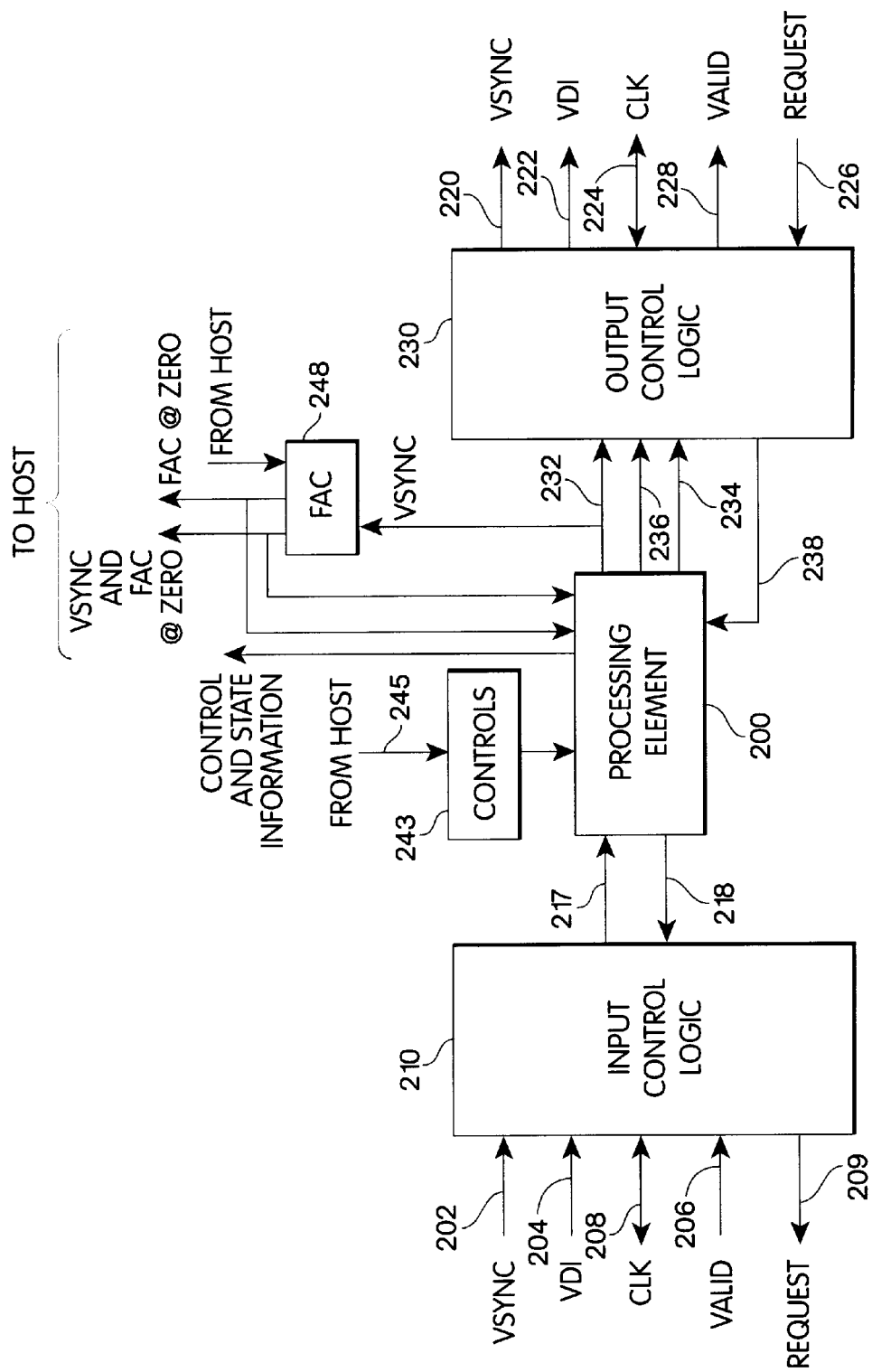
FIG. 3A is a block diagram of a processing element having an input and an output both using the asynchronous digital video interface in accordance with the present invention.

A device using an interface and control information as described above will now be described in connection with FIG. 3A. FIG. 3A illustrates a device with a single processing element, and both an asynchronous input and an asynchronous output using an interface in accordance with the invention. Other embodiments of a device with asynchronous input signals and synchronous output signals, a processing element with synchronous input signals and asynchronous output signals, and a long interconnect between two asynchronous devices, will be described in more detail below.

In FIG. 3A, processing element 200 performs most of the processing on the input data. On the input side, the device receives a boundary signal 202, data 204, a valid data input signal 206 and an interface clock 208, and provides an output signal 209 indicating a request. All of these signals are received by input control logic 210, described in more detail below. The interface clock 208 controls latching of the data performed in the input control logic. The processing element 200 receives data from the input control logic, along with the associated boundary signal as indicated at 217. The processing element also provides an output 218 to be used by the input control logic to generate the request signal.

On the output side, the device provides as its output a boundary signal 220, data 222 and a valid data signal 228, and receives both an interface clock signal 224, and an input request signal 226. The output interface clock 224 may be different from the input interface clock 208. The data, boundary signal and valid data signal are provided to output control logic 230, described in more detail below. The output control logic also receives, from the processing element 200, a boundary signal 232, data 234, and valid data signal 236. The output control logic 230 passes on the request signal to the processing element 200 as indicated at 238. Loading of latches within the output control logic occurs upon an edge of the interface clock 224 depending on the state of the valid data and request signals.

The processing element 200 receives control information from control registers 243. The control registers are loaded via a bus connected to the host computer as indicated at 245. The control registers 243 may be implemented using the register constructions shown below in FIG. 4A and 4B. Control information may be double buffered and thus have two states, an "active" state and a "shadow" state. The active state contains the current state used in processing, while the shadow state is the control information for the next function to be performed.

Figure 5:
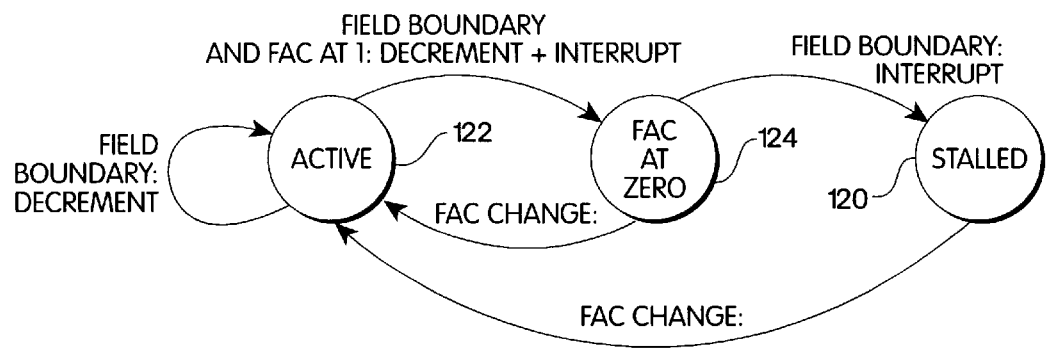
FIG. 5 is a state diagram for a field advance counter.

The processing element also has an associated field advance counter 248 which has a corresponding state diagram described below in connection with FIG. 5. The contents of the field advance counter represent the number of data samples for which the active control information is valid. For processing of motion video data, the FAC may be used to represent a number of frames, lines or pixels or other subset of motion video data. The field advance counter decrements every time the boundary signal 232 is asserted at the output of the processing element 200. One or more processing elements that are interconnected using the interface described above define a single "control domain." Each control domain has a corresponding field advance counter. The counter has logic which generates interrupt and loading signals to the host processor to inform the host of its state and to processing element to control processing by the processing element.

Figure 3B:
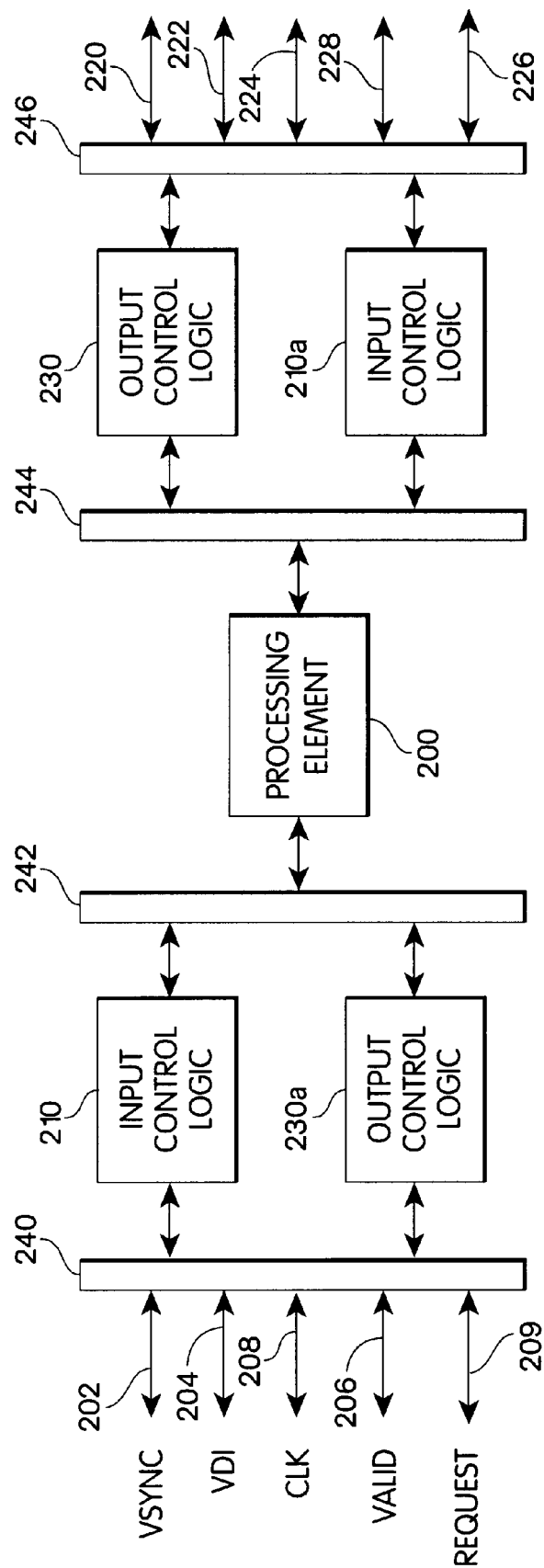
FIG. 3B is a block diagram of another embodiment of the processing element of FIG. 3A.

An alternate embodiment is shown in FIG. 3B. FIG. 3B includes four three-state buffer arrangements 240, 242, 244 and 246, which enable the device and its interfaces to operate in two directions in a selectable manner. In this embodiment, each interface has a corresponding identical input and output control logic as indicated at 230 and 210A and 210 and 230A. This embodiment is otherwise the same as that in FIG. 3A, and would also include a control information register and field advance counter. In this embodiment, the control information would indicate the direction of flow of information on the input and output interfaces, and the processing element would generate appropriate control signals to control the three-state buffer arrangements 240, 242, 244 and 246.

Figure 3C:
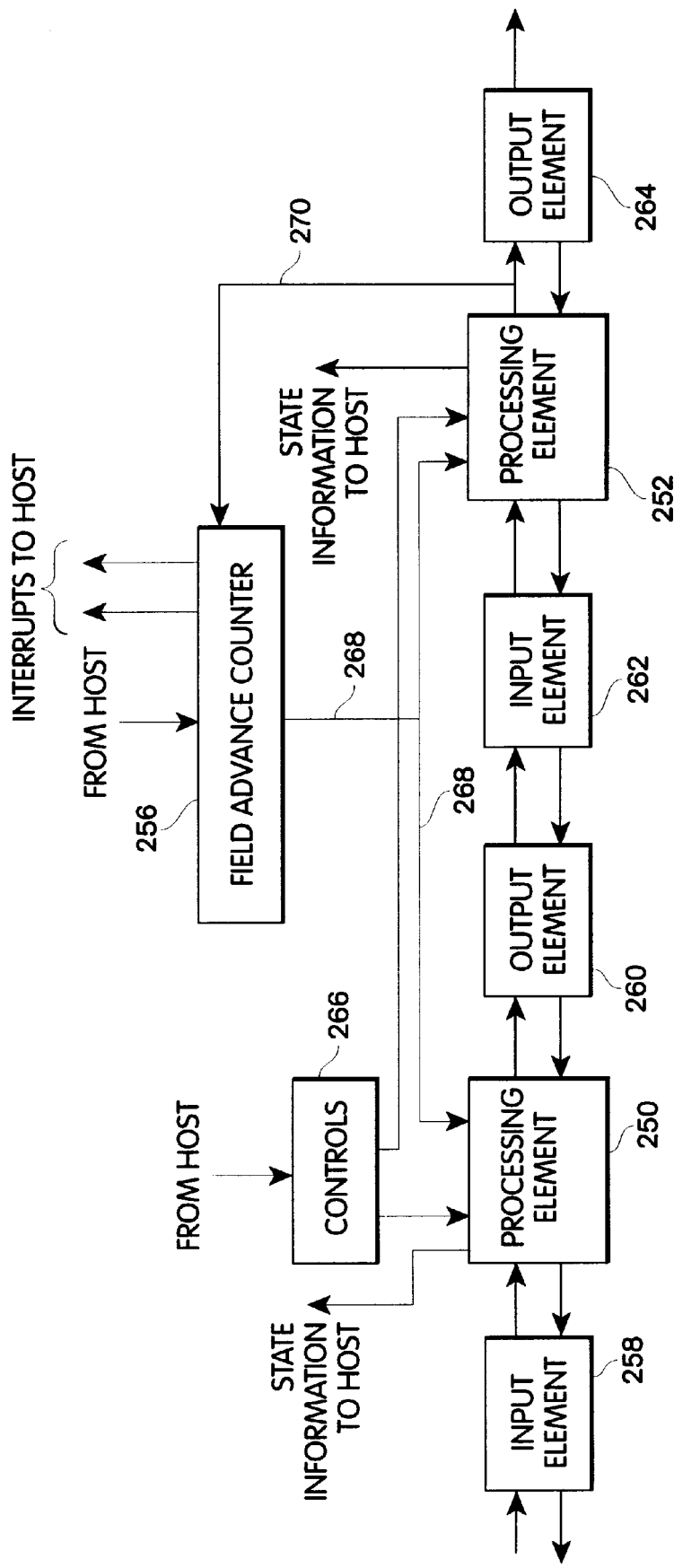
FIG. 3C is a block diagram of a circuit having two processing elements in a single control domain.

FIG. 3C illustrates an embodiment with two processing elements 250 and 252 interconnected using an interface in accordance with the present invention. The processing elements 250 and 252 receive control information from control registers 266 and are controlled by a single field advance counter 256. Accordingly, these single control domain. Processing elements 250 and 252 are interconnected by input/output elements 258, 260, 262 and 264. The field advance counter 256 controls the control information in control registers 266. The processing elements 250 and 252 may receive different control information or may share control information. In this embodiment, the processing elements 250 and 252 receive the same outputs indicating whether the counter 256 is at zero, as indicated at 268. However, the counter 256 decrements according to the boundary signal 270 output by the last processing element 252 in the control domain.

Having now described several embodiments of devices incorporating a field advance counter and associated control information for controlling processing of the processing elements, more details of the field advance counter and control information registers will now be described.

Figure 4A:
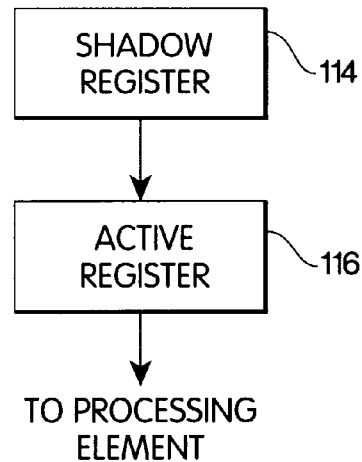
FIGS. 4A and 4B illustrate two embodiments for double buffering control information.

Two embodiments for performing double buffering of control information will now be described in connection with FIGS. 4A and 4B. As shown in FIG. 4A, the host computer writes control information into a shadow register 114. Upon the arrival of the next clock edge when the boundary signal output by the processing element is valid, the contents of the shadow register 114 are loaded into the active register 116. The output of the active register is the control information used by the processing elements within the control domain.

Figure 4B:
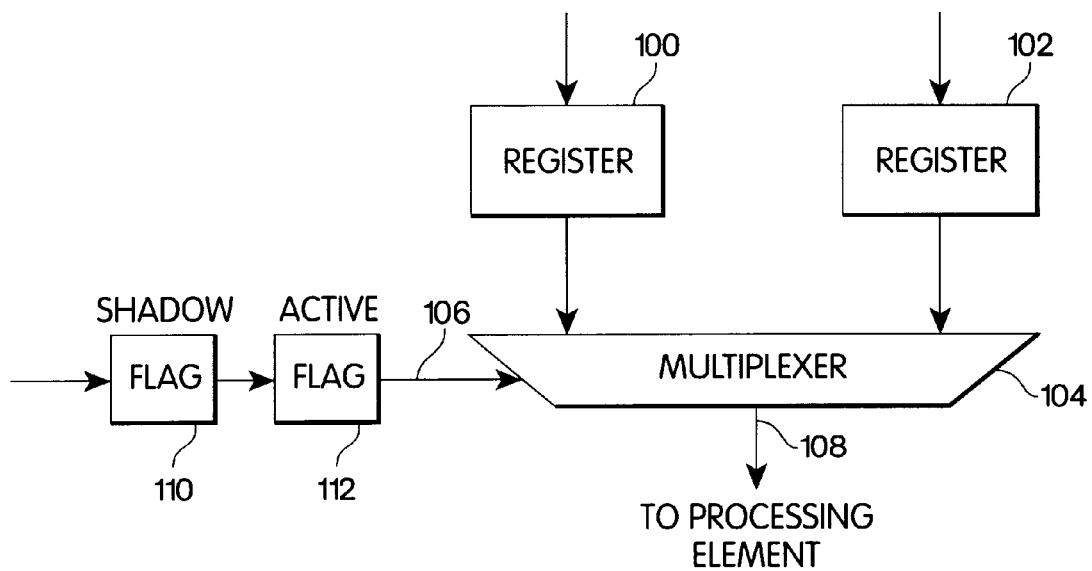

In another embodiment shown in FIG. 4B, a first register 100 and a second register 102 are connected to first and second inputs, respectively, of a multiplexer 104 which is controlled by a double buffered flag bit 106 to select one of the inputs as its output 108. The output of the multiplexer provides the control information used by the processing elements within the domain. The host computer loads the flag bit in a shadow register 110. Upon the arrival of the next clock edge when the boundary signal output by the processing element is valid, the contents of the shadow register 110 are loaded into an active register 112, the output of which controls the multiplexer 104. If the shadow register was not updated since the last boundary signal, the active register would not change.

Control information is copied from the shadow registers to the active registers, shown in FIGS. 4A and 4B, when a boundary signal output by the processing element becomes asserted or when the processing element is stalled (due to only the FAC being stalled) and the field advance counter transitions to a non-zero value.

The field advance counter (FAC) will now be described in more detail in connection with FIG. 5. The FAC is a counter that has a size corresponding to a maximum number of samples which may be processed by its corresponding processing elements before those elements stop processing. The FAC, for example, may be eight (8) bits, which corresponds to an advance load of 255 samples. It should be understood that the system is designed to support any value loaded into the FAC, including only one sample. The FAC decrements immediately when written if it was in a stalled state prior to being written, as well as when a sample boundary is detected. The FAC signals the processing element to stop processing when the counter is exhausted, i.e, is at zero ('0'), and the last sample is processed, which is signaled by a boundary signal output by the last processing element in the control domain. If there are multiple processing elements at the end of a control domain, the FAC is decremented after all of the processing elements indicate a sample boundary. The FAC also is used to signal the host computer, via an interrupt, when a series of operations is about to be completed at the end of the sample when it transitions to a count of '0.' Upon receiving this interrupt, the host computer can update the control information to take effect after the current sample is processed. If the host computer is unable to respond to the interrupt before the end of the sample, the FAC state of '0' when the boundary signal at the output of the processing element indicates a sample boundary causes the flow of data through the device to stop or stall, and a second interrupt is generated to the host computer. This stalling prevents the processing element from continuing to operate when its control information is no longer valid. Processing continues when a non-zero value is loaded into the FAC and the data of the next sample is ready at the input of the first processing element in the control domain. The host should not write a value into the FAC when the FAC is at one or zero.

During reset the FAC is cleared to a '0' value and no processing occurs by the processing element. After reset, a status bit provides the interrupt to the host to indicate that the FAC has reached '0.' When a non '0' value is loaded into the FAC, control information for the next field becomes immediately available to the associated processing elements in the control domain, and processing by the processing elements in the control domain begins on the new data of the next field as the data become available at the device interface.

A state diagram for the field advance counter will now be described in connection with FIG. 5. There are three states: stalled 120, active 122 and FAC at zero 124. When a field advance counter transitions to a non-zero value, the state of the field advance counter transitions from either state 124 or state 120 to the active state 122. When the boundary signal output by the processing element signifies an end of a sample has been reached, and the field advance counter is greater than one, the transition returns to the active state. When the field advance counter is one and a sample boundary is encountered, a transition occurs to the FAC at zero state 124 with an interrupt signal to the host indicating the field advance counter is at zero. If a sample boundary is encountered when the FAC is at zero, a transition occurs to the stalled state 120 and an appropriate interrupt also is sent to the host.

The field advance counter also may include an additional register, herein called a write save register. This write save register captures the current state of the field advance counter when a new value is written to the field advance counter. This register allows processing elements to be cleanly halted by writing a "one" into the field advance counter. To restart, an application may determine a final number of fields to be played by reading the saved value from the write save register. The register may be used, for example, by having the host determine whether the field advance counter value is greater than one, and if greater than one, writing the field advance counter value into the write save register. The write save register also may be implemented directly in hardware.

The field advance counter provides the capability for time varying control information to be provided to a processing element. The control information is time-varying since it includes parameters to be applied to one sample and then is updated at the end of each sample for the next sample. Such a capability allows for various data to be multiplexed through the processing element, to allow different kinds of processing to be applied to the same kinds of data through the processing element, and many other features. Where the processing element changes the form of the incoming data, such as by changing its temporal or spatial resolution or color format, different kinds of conversion can be performed. Where the processing element is changing the content, for example by performing a keying function or a blend of two video streams or other manipulation, the actual function performed by the processing element can be varied over time through the changing of the control information.

In order to effectively use the interface and field advance counter as described above, the processing element must be able to start and stop processing based on the information provided by the field advance counter. This restriction is imposed because the control information is only valid for the number of data samples specified by the field advance counter. If the field advance counter is stalled, then the active control information received by the processing element is no longer valid.

Figure 6:
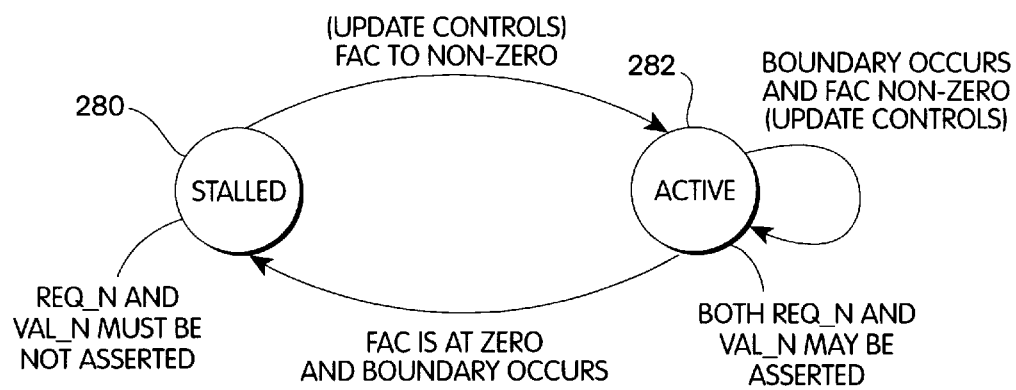
FIG. 6 is a state diagram for a processing element using an interface and field advance counter in one embodiment of the present invention.

FIG. 6 is a state machine diagram for the processing element 200 of FIGS. 3A and 3B. There are two states for a processing element, stalled 280 and active 282. In the stalled state 280, the processing element cannot receive data or output valid data. Accordingly, the request and valid data signals are deasserted. When the field advance counter associated with the processing element transitions to a non-zero value, the processing element transitions to the active state 282. In this state, both the request and valid data signals may be asserted. Whether they are asserted depends on the actual processing performed by the processing element. For example, the processing element may immediately request data, but may not output valid data for several clock cycles until the next output sample is completely computed. In the active state 282 a transition occurs when a boundary signal is generated by the processing element. If the field advance counter is non-zero when the boundary signal generated by the processing element indicates a sample boundary, then the processing element remains in the active state. If the field advance counter is already at zero when the boundary signal generated by the processing element indicates a sample boundary, then the processing element transitions from the active state 282 to the stalled state 280. The state diagram for controlling the processing element may be implemented using control logic associated with the hardware which actually performs the processing. The stalled and active states respectively disable and enable activity of the processing element.

It should be understood that the stalling occurring in step 280 of FIG. 6 is different from other stalling that may occur due to flow control of data through the data interface that connects interconnected processing elements. In other words, active state 282 may include several states in which the processing element may be actively processing data or may be stalled due to flow control effects from the interface with other components. Stalling due to flow control over the interface may occur at any byte of data, even between components of samples in multiplexed data. On the other hand, stalling of a processing element due to a need for control information typically only occurs between samples.

Having now described the processing element field advance counter and control information in a device in accordance with one embodiment of the invention, the input and output control logic will now be described in connection with FIG. 7.

Figure 7A:
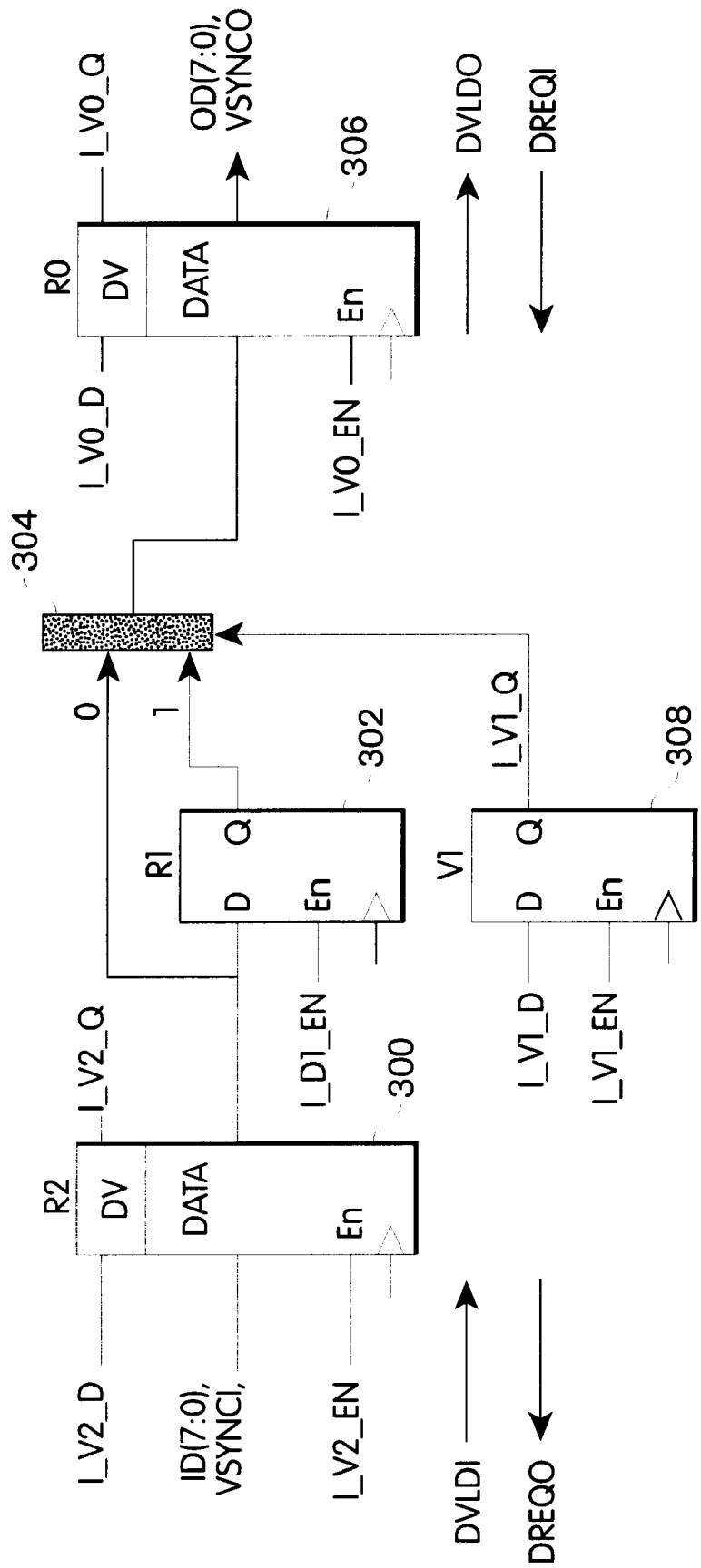
FIG. 7A–E are block diagrams of embodiments of the input and output control logic shown in FIGS. 3A and 3B.

FIG. 7A shows one embodiment of the input and output control logic in FIG. 3A. In this embodiment, the output control logic is in essence the same as the input logic; therefore only the input logic will be described. The input control logic, shown in FIG. 7A, includes a first register 300. Its output is applied to a second latch 302 and to a multiplexer 304. The multiplexer 304 also receives the output from register 302. The output of multiplexer 304 is supplied to a register 306. A latch 308 receives the input request and valid data signals and uses them to control multiplexer 304.

The signals illustrated in FIG. 7A are defined in the following table and logic equations. All logic equations herein are in VHDL (IEEE standard 1076–1987).

| Signal | Direction | Description |
|---|---|---|
| DREQI | Input | Data Request In from Receiver |
| DVLDI | Input | Data Valid In from Sender |
| ID(7:0) | Input | Data from Sender |
| VSYNCI | Input | Boundary Signal from Sender |
| CLK_27 | Input | Clock Signal |
| DREQO | Output | Data Request to Sender |
| DVLDO | Output | Data Valid to Receiver |
| OD(7:0) | Output | Data Output to Receiver |
| VSYNCO | Output | Boundary Signal to Receiver |

The logic equations representing the output signals provided by the various logic circuits 300 through 308 in FIG. 7A are represented by the following table:

| | | |
|---|---|---|
| DVLDO | <= | I_V2_Q; |
| DREQO | <= | NOT I_V2_Q OR OR NOT I_V1_Q OR NOT I_V0_Q: |
| I_V0_EN | <= | DREQI OR NOT I_V0_Q; |
| I_V1_EN | <= | DREQI OR NOT I_V0_Q OR NOT I_V1_Q; |
| I_V2_EN | <= | NOT I_V2_Q OR NOT I_V1_Q OR NOT I_V0_Q; |
| I_V0_D | <= | I_V2_Q OR I_V1_Q; |
| I_V1_D | <= | I_V2_Q AND NOT I_V0_EN; |
| I_V2_D | <= | DVLDI; and |
| I_D1_EN | <= | NOT I_V0_Q OR NOT I_V1_Q. |

The circuit shown in FIG. 7A may be implemented using a programmable logic array or specialized circuit or discrete hardware components.

Figure 7B:
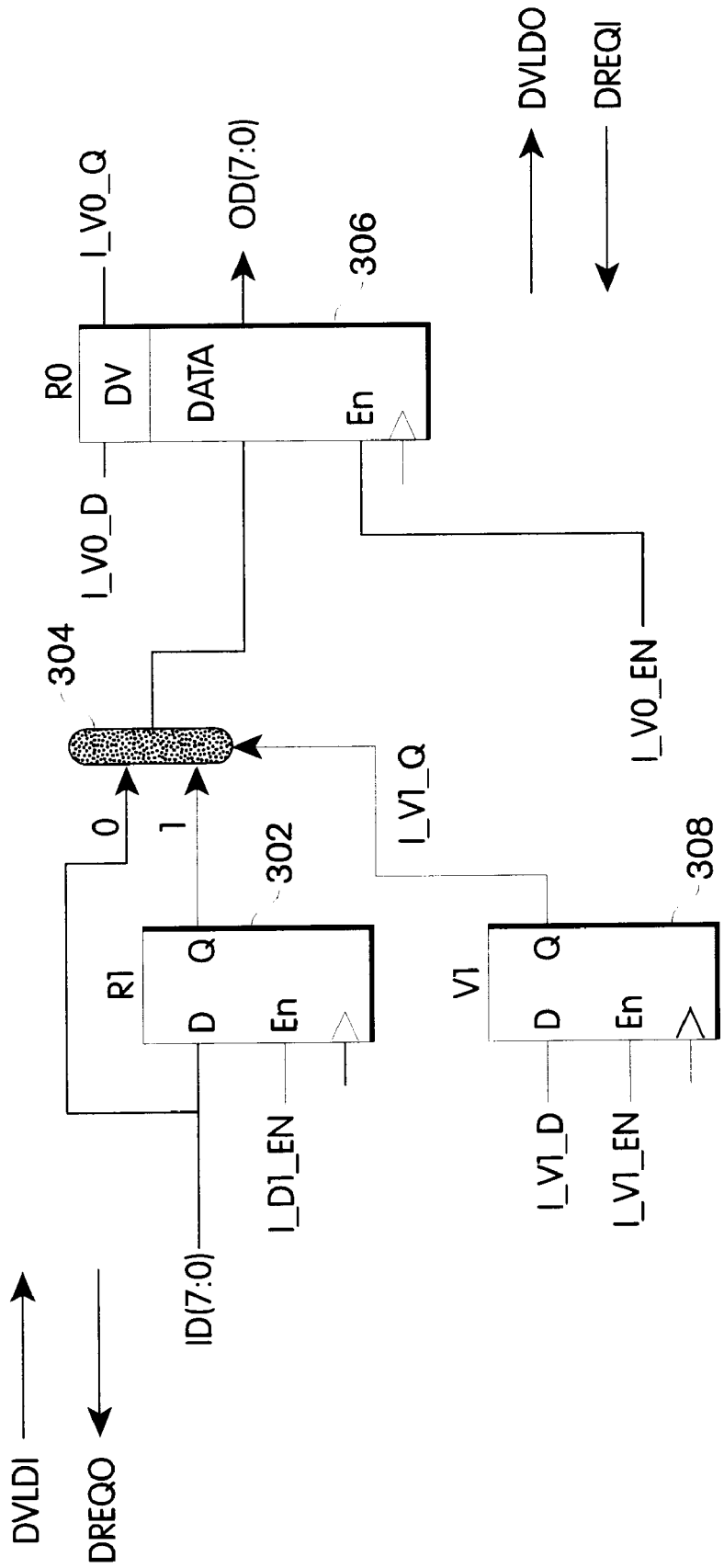

The circuit illustrated in FIG. 7A favors output timing. This circuit may be modified to eliminate register 300 as shown in FIG. 7B. The logic equations representing the output signals provided by the various logic circuits 302 through 308 are represented by the following table.

| | | |
|---|---|---|
| I_V0_EN | <= | DREQI OR NOT I_V0_Q; |
| I_V1_EN | <= | DREQI OR NOT I_V1_Q; |
| I_D1_EN | <= | NOT I_V1_Q; |
| I_V0_D | <= | DVLDI OR I_V1_Q; |
| I_V1_D | <= | DVLDI AND NOT I_V0_EN: |
| DVLDO | <= | I_V0_Q; |
| DREQO | <= | NOT I_V1_Q; |

Figure 7C:
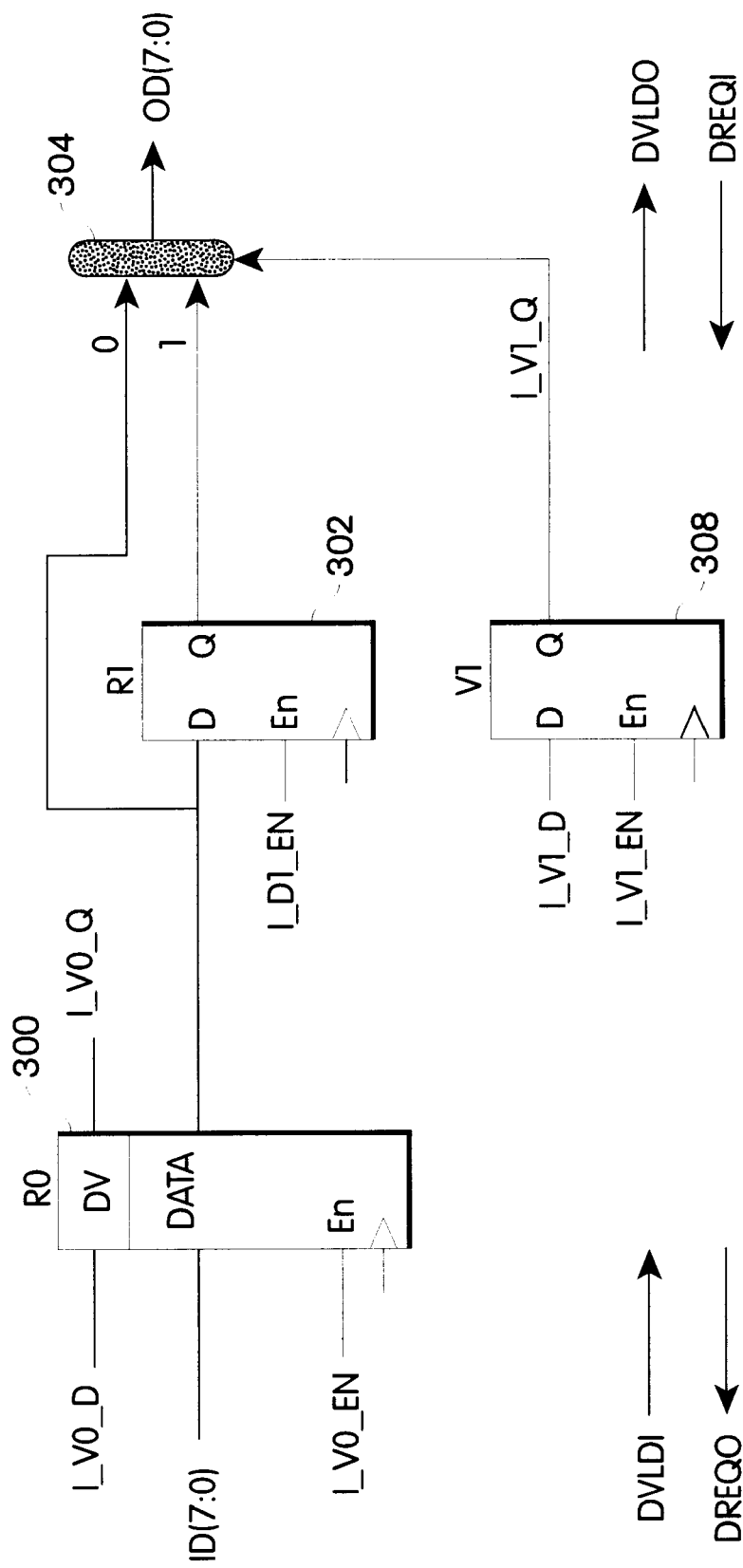

An interface that favors input timing requirements is shown in FIG. 7C. In this figure, the register 306 of FIG. 7A is deleted. The logic equations representing the output signals provided by the various logic circuits 300 through 306 in FIG. 7C are represented by the following table:

| | | |
|---|---|---|
| I_V0_BN | <= | NOT I_V0_Q OR NOT I_V1_Q; |
| I_V1_EN | <= | NOT I_V1_Q OR DREQI; |
| I_D1_EN | <= | NOT I_V1_Q; |
| I_V0_D | <= | DVLDI; |
| I_V1_D | <= | I_V0_Q AND NOT DREQI; |
| DVLDO | <= | I_V0_Q OR I_V1_Q; |
| DREQO | <= | NOT I_V0_Q OR NOT I_V1_Q; |

Figure 7D:
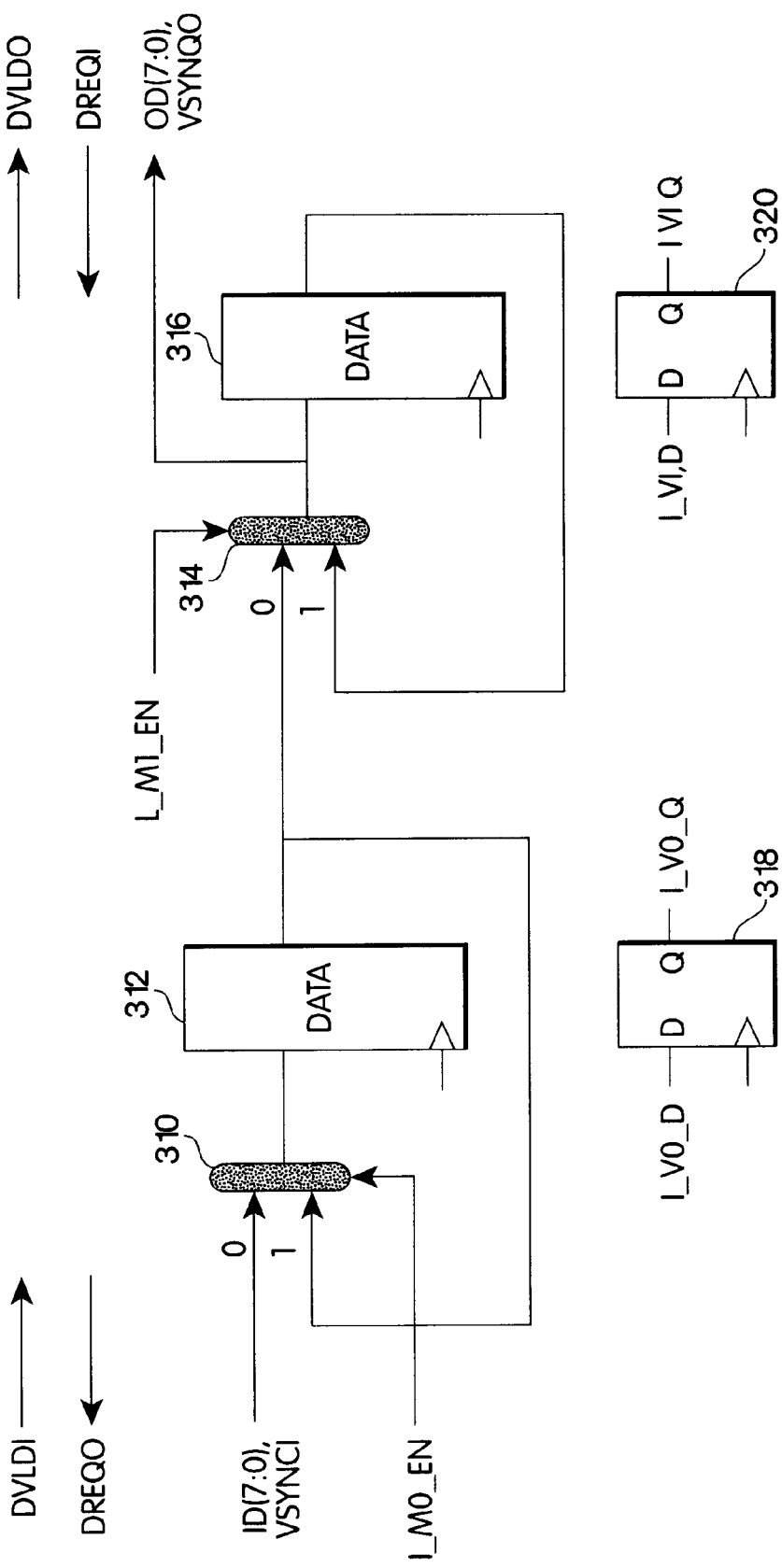

FIG. 7D is a block diagram of an embodiment of the input control logic which optimizes input interface timing parameters. It includes a multiplexer 310, latch 312 connected to the output of multiplexer 310. The output of latch 312 is fed back to an input of the multiplexer 310. The output of latch 312 is also applied to a second multiplexer 314. The output of multiplexer 314 is connected to a data latch 316, whose output is fed back to an input of multiplexer 314. The output data to the interface is provided by the output of the multiplexer 314. The circuit also includes latches 318 and 320 whose signals are described by the logic equations which represent the control equations for the various logic circuits in FIG. 7D:

| | | |
|---|---|---|
| i_m0_en | <= | i_v0_q AND i_v1_q; |
| i_m1_en | <= | i_v1_q; |
| i_v0_d | <= | dvldi OR (i_v0_q AND i_v1_q); |
| i_v1_d | <= | NOT dreqi AND (i_v0_q OR i_v1_q); |
| dreqo | <= | NOT i_v0_q OR NOT i_v1_q; |
| dvldo | <= | i_v0_q OR i_v1_q; |

Figure 7E:
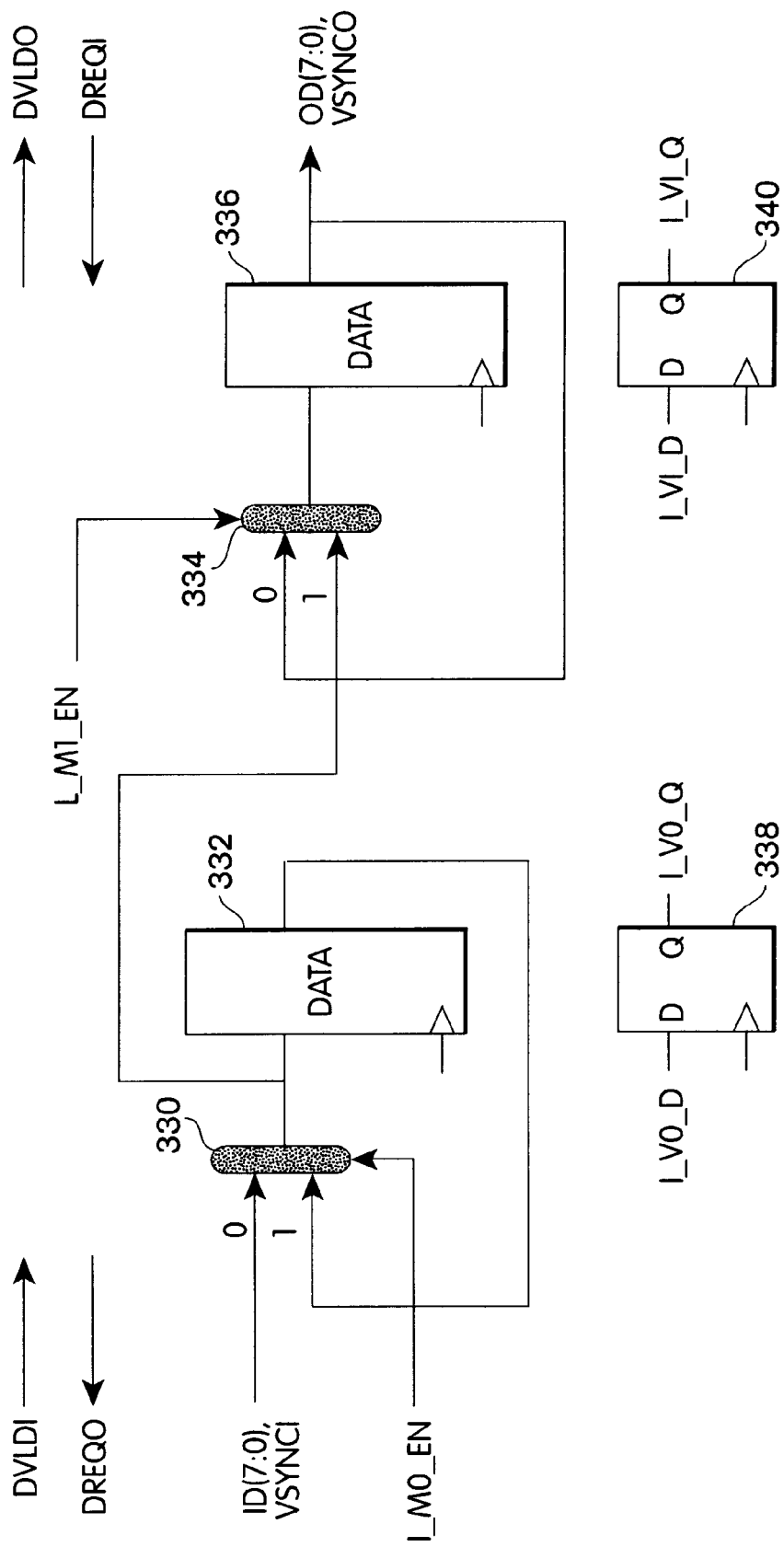

FIG. 7E is a block diagram of an embodiment of the output control logic which is optimized for output interface timing parameters. In this circuit, a multiplexer 330 provides an output to a data latch 332, whose output is fed back to an input of a multiplexer 330. The output of multiplexer 330 is fed to an input of multiplexer 334. The output of multiplexer 334 is applied to a data latch 336. The output of the data latch provides the output of the output control logic and is also fed back to an input of multiplexer 334. Two additional latches are provided as indicated at 338 and 340. The logic equations representing the control of the circuit of FIG. 7E are represented by the following table:

| | | |
|---|---|---|
| i_m0_en | <= | dreqi OR NOT i_v0_q; |
| i_m1_en | <= | i_v1_q; |
| i_v0_d | <= | (i_v0_q AND NOT dreqi) OR i_v1_q OR dvldi; |

-continued

```
i_v1_d    <= NOT dreqi AND (i_v1_q OR (dvldi AND i_v0_q));
dreqo     <= NOT i_v1_q;
dvldo     <= i_v0_q;
```

For some input and output interfaces, it may not be possible to provide the data request/valid handshake described above. For example, the sender may need a number of clock cycles to extract the data from an associated data storage memory. In other words, timing parameters and protocols for accessing data memories associated with the sender may require that the request signal be asserted from the receiver several clock cycles before the valid data signal may be asserted. In general, the latency between the request signal and valid data signal will be fixed and known. The interface therefore uses a pipelined data request/valid handshake to transfer data.

Figure 7F:
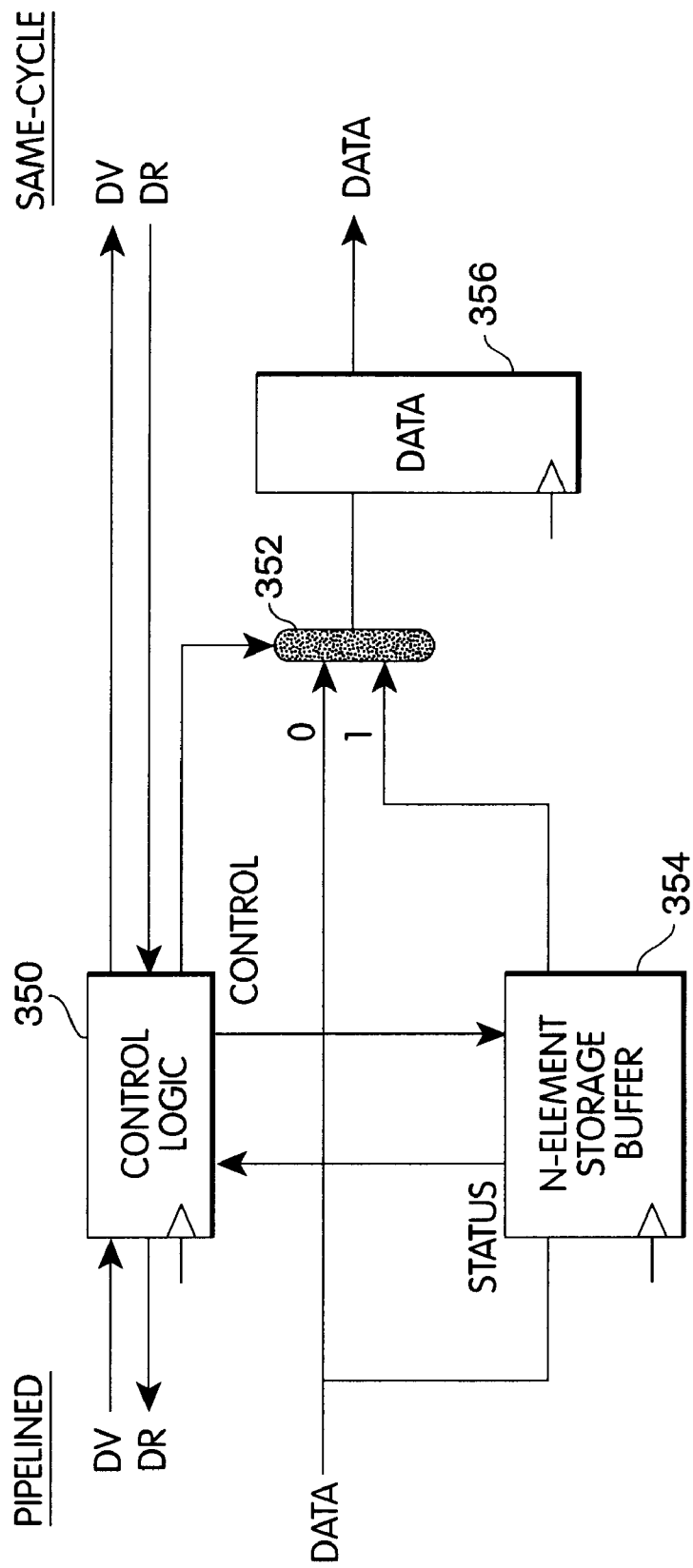
FIG. 7F–G are a block diagram and timing diagram, respectively, illustrating another embodiment of input interface logic with pipelined handshake signals.

In such a system, a mechanism which stalls the flow of data with a fine level of granularity is used. One example of an interface which provides this capability is shown in FIG. 7F. This circuit may be used where a pixel component requested by one circuit will not be available from another circuit until four clock cycles later, which can occur, for example, when the depth of the control signal pipeline to the memories is four clock cycles. The input interface of the receiving circuit translates requests between internal logic to the sending circuit, buffering the additional pipelined data.

The input interface design, shown in FIG. 7F, contains a data storage buffer 354 whose capacity for data storage is equal to the latency or pipeline delay from data request to data valid for the sender. In the figure, this value is referred to as N. The circuit includes control logic 350 which controls the insertion and removal of data from the buffer. The control logic 350 performs these operations in response to the pipelined valid data signal from the sender and the internal same-cycle request signal from the processing element. A data latch 356 receives the output from multiplexer 352 to provide data to the processing element. In operation, the control logic 350 provides data from the storage buffer 354 to the receiver when the buffer 354 is not empty by controlling the data multiplexer 352 and the buffer 354. This multiplexer 352 can be used to select either data from the storage buffer 354 or the sender for transfer to the receiver. If the buffer 354 is empty, the control logic 350 controls the multiplexer 352 to provide data from the sender. If valid data arrives from the sender while the control logic 350 is providing data to the receiver from the storage buffer 354, the control logic 350 causes the data to be placed into the storage buffer 354. If valid data arrives from the sender when the receiver cannot accept it, the control logic 350 causes the data to be placed in the storage buffer 354. This situation may occur when the processing element deasserts the request signal, but the sender has not completed processing the preceding pipelined data requests.

In the data transfer protocol for the circuit of FIG. 7F, the data source does not assert the data valid signal until after receiver asserts the data request signal. The source asserts the data valid signal N clocks later if it has data to transfer. This handshaking guarantees a gap in the input stream where the receiver can insert any buffer pixels remaining from any previous transfers. Similarly, removing the data request signal for one clock cycle ensures that a one cycle gap will appear in the input data N clocks later, where the interface can insert one buffered pixel. While the data request signal remains asserted, the source may assert the valid data signal as data is available. The source may hold data valid asserted after the receiver deasserts its data request, in order to transfer the data corresponding to any pipelined requests.

Figure 7G:
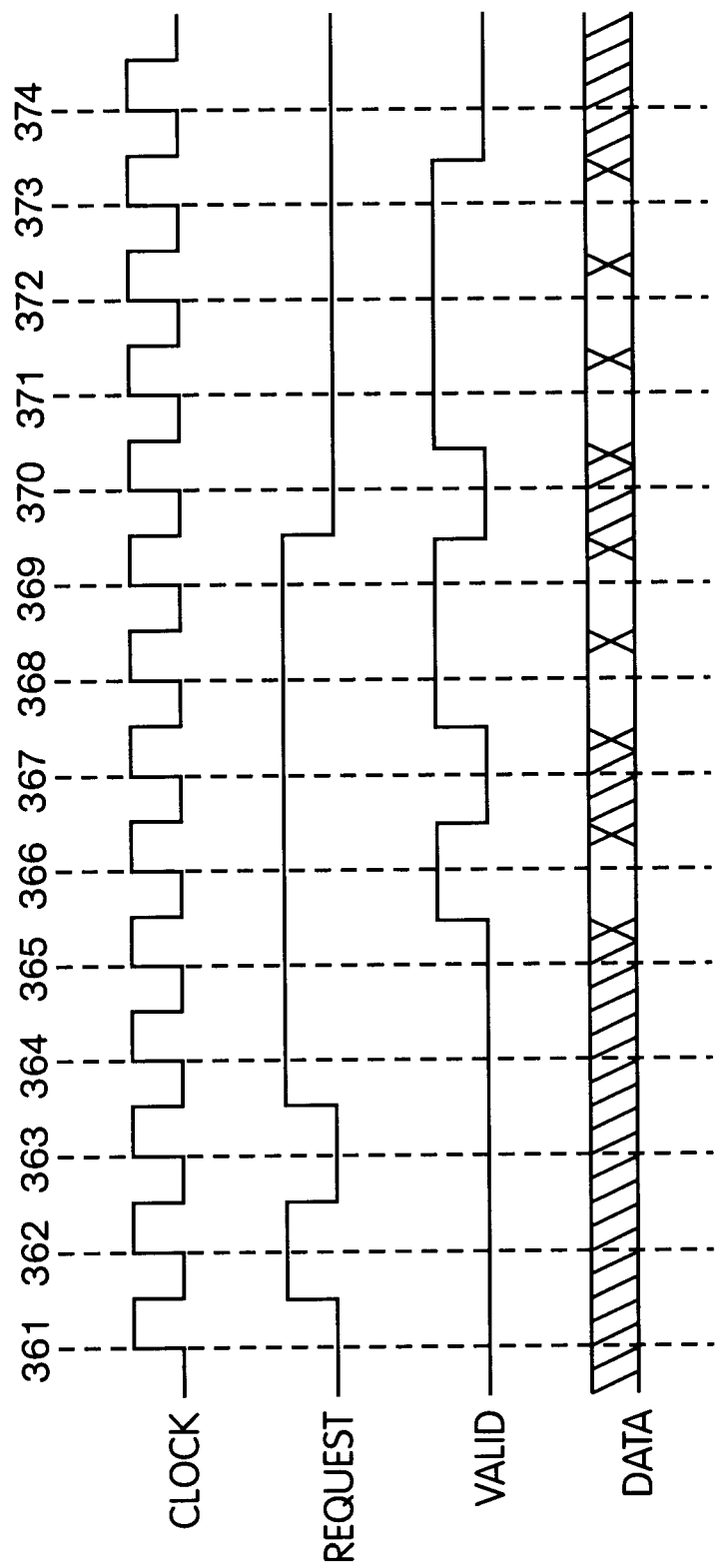

The timing diagram in FIG. 7G illustrates the behavior of the interface, configured for a pipeline depth of N equal to four. In this example, data requested on clock 362 is not available until clock 366. Note that the deassertion of this request signal on clock 363 causes a corresponding deassertion of the valid data signal on clock 367. Data is transferred again on clocks 368 and 369, corresponding to the requests issued on clocks 364 and 365. Data was not available for clock 370, and the request made on clock 366 was not honored. Data again became available and the requests made on clocks 367, 368, and 369 were fulfilled on clocks 371, 372, and 373. Request was deasserted on clock 370, resulting in no transfer on clock 374. The control logic 350 in FIG. 7F accounts for the lack of valid data when a request for data is made.

Having now described a general embodiment of the present invention, some additional embodiments for use in more specialized circuits will now be described.

Figure 8:
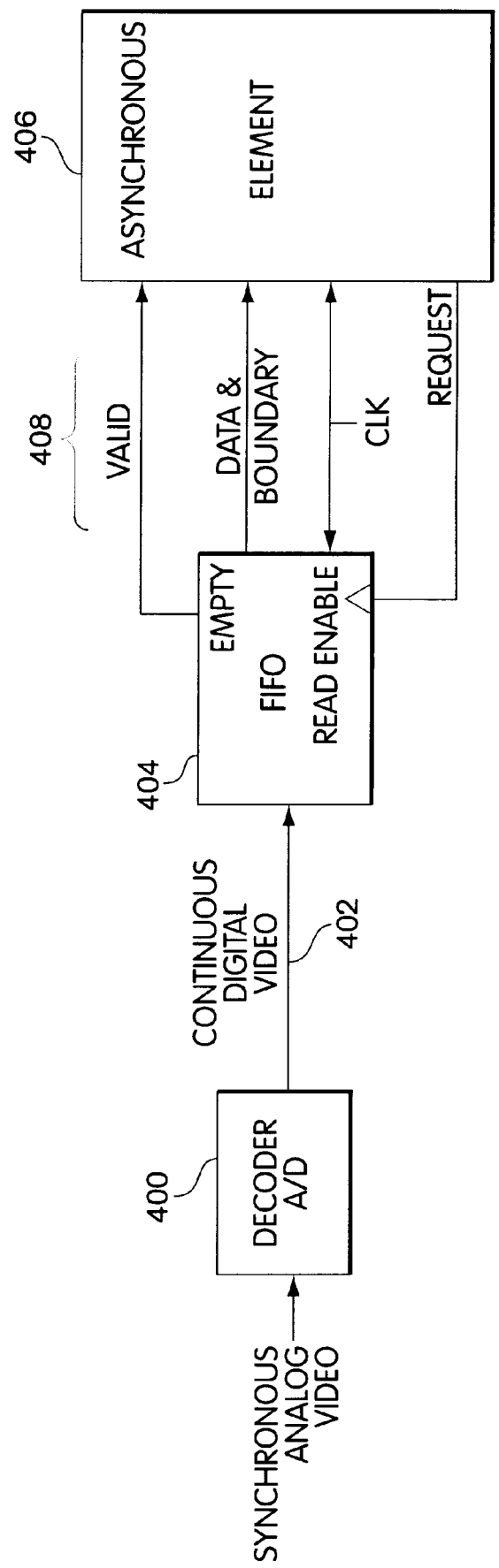
FIG. 8 is a block diagram illustrating an interface in one embodiment of the invention for digital video input.

The present invention also may be used to connect synchronous and continuous flow video stream components with an asynchronous processing element as described above. For example, when inputting digital video information into a computer as shown in FIG. 8, there typically is a decoder 400 that receives an input analog signal to provide a continuous flow video stream of digital data as indicated at 402. This digital data may be fed to a first-in/first-out buffer 404. The FIFO 404 is connected to an asynchronous component using an interface in accordance with the present invention as indicated at 406 and 408. The FIFO has status signals which may be used to provide the appropriate interface signals. For example, a "not empty" indication from the FIFO 404 can provide the valid data signal. The contents of the FIFO include the boundary information and video data. A clock signal can be provided to the interface as well. In this embodiment, the clock signal drives the transfer of data from the FIFO to the asynchronous element 406. The FIFO also may be asynchronous with appropriate modifications to the control signals. The asynchronous element 406 provides the request data signal which is applied to a read enable input of the FIFO. Accordingly, when data is available in the FIFO, it will be transferred to the asynchronous element 406 when the request data signal enables read output from the FIFO. The FIFO should be sufficiently large to account for variations in the access to the FIFO 404 by the asynchronous element 406 so that it does not overflow. In one embodiment, the capacity of the FIFO is irrelevant if an input control logic block, such as described above in connection with FIGS. 7A–7E is inserted between the decoder and the FIFO. In this embodiment, a FAC may not be necessary if the input data is such that time-varying controls are not necessary.

Figure 9:
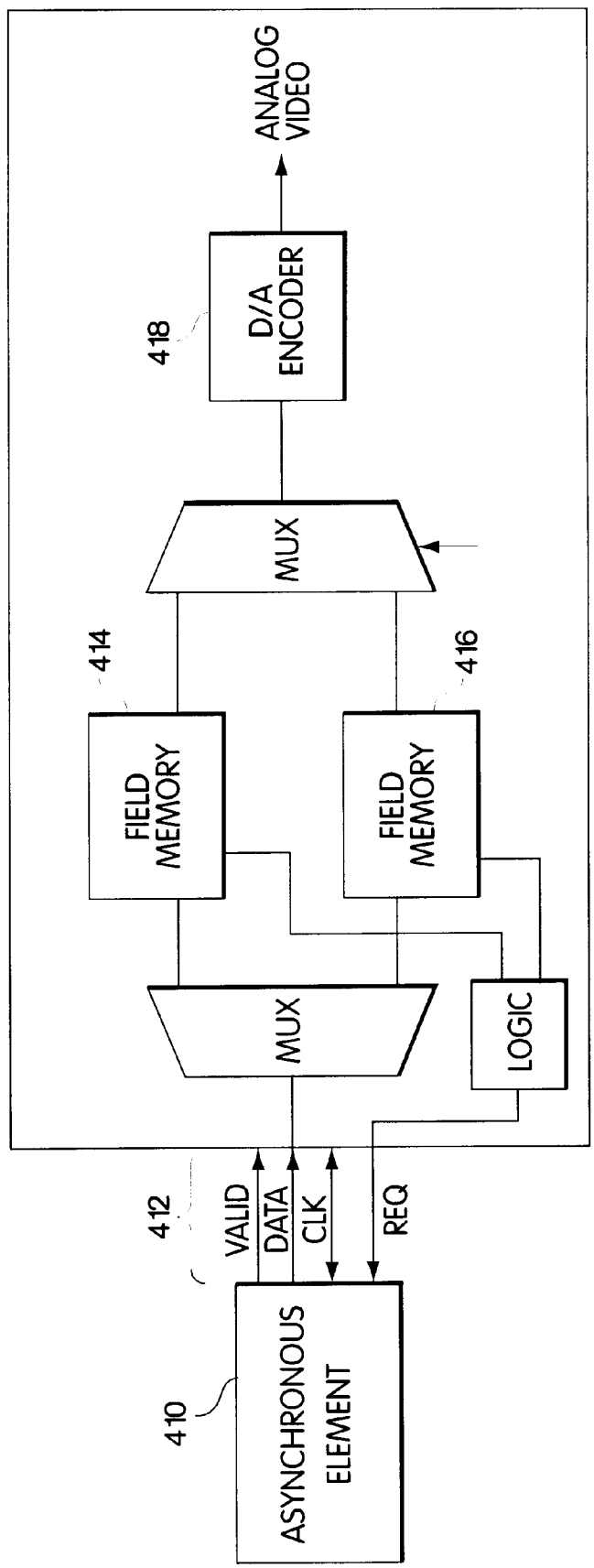
FIG. 9 is a block diagram illustrating an interface in one embodiment of the invention for digital video output.

FIG. 9 shows a similar connection between an asynchronous element and a synchronous element which receives data from the asynchronous element 410. The interface is still used as indicated at 412. The data is applied to one of two field memories 414 and 416. The field memories are typically sequential memories that have read and write pointers that are reset every time a field is read or written. An encoder 418 reads data from either field memory 414 or 416 in order to provide output analog motion video data. The encoder creates a continuous flow of video stream of digital data between the field memories and the encoder. In order to connect with an asynchronous element 410 over an interface 412, the field memories provide a request signal. This request signal, in one embodiment, may be generated when either field memory 414 or 416 is empty. In general, the request signal only deasserts at field boundaries and the request is valid for an entire field. This specification may simplify some processing by the asynchronous element 410 by allowing burst transfers into the field memory.

In some embodiments, the connection between elements such as those shown in FIGS. 8 and 9 is over a long cable, e.g., one hundred feet long or more. In such a circumstance, the propagation delay of a change in a request signal or valid signal between a sender and a receiver is such that a transition in the request signal may be detected at the sender several clock cycles after the request signal is changed by the receiver. To account for such a case, the sender may wait for requests to stabilize by waiting, e.g., for about sixteen clock cycles, after every boundary signal that is transmitted to determine whether the request signal from the receiver remains asserted. This embodiment is useful where it is known that the request signal is only asserted or deasserted at field boundaries and remains in a particular state for an entire field.

Figure 10:
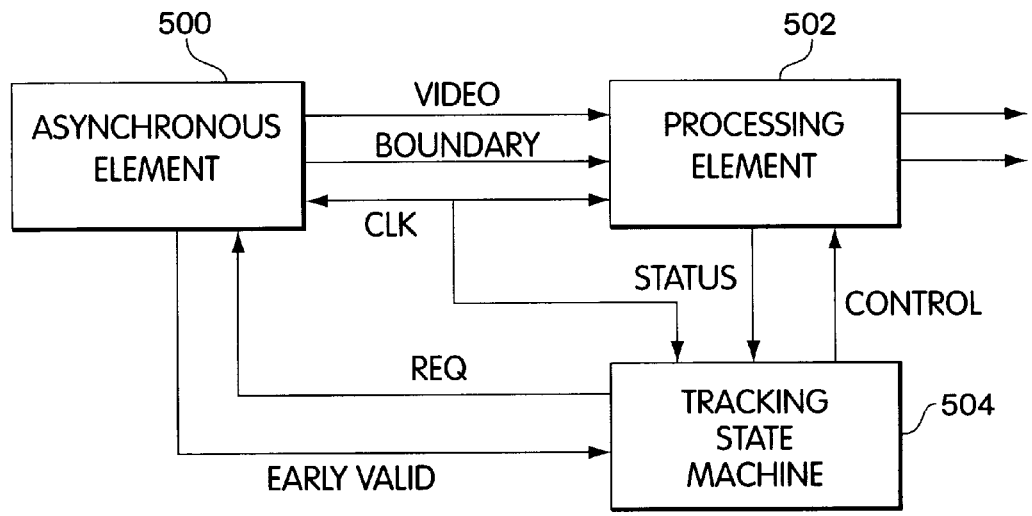
FIG. 10 illustrates an embodiment of the present invention where the output of a processing element having an interface in accordance with an embodiment of the present invention is connected to a processing element without such an interface, using a tracking state machine.

FIG. 10 illustrates how the present invention can be applied to allow for interconnection between a processing element utilizing the interface described above with another processing element that does not provide such capability. FIG. 10 shows the asynchronous element 500 connected to another processing element 502. The processing element 502 receives the auxiliary information of the boundary signal as well as the data from the asynchronous element 500. The valid data and request signals are passed through a tracking state machine 504. The tracking state machine provides control information to the element 502 and receives status information from the processing element 502. The processing element 502 must be such that it provides adequate status information to determine whether it is ready to accept data and adequate control inputs to allow the tracking state machine to stall processing by the element 502. The tracking state machine receives an "early" valid data signal and outputs a request data signal to the asynchronous element 500. The early valid data signal is not the one actually output by the interface, but one provided as an input to the output control logic of element 500. The tracking state machine is a copy of the output control logic, such as shown above in FIG. 7B, but without latches for capturing the video data. While FIG. 10 illustrates a clock signal provided to all three elements 500, 502 and 504 from an external source, the clock signal may be provided by the asynchronous element 500. The request signal from the processing element 502 also may be associated with its own clock signal.

Figure 11:
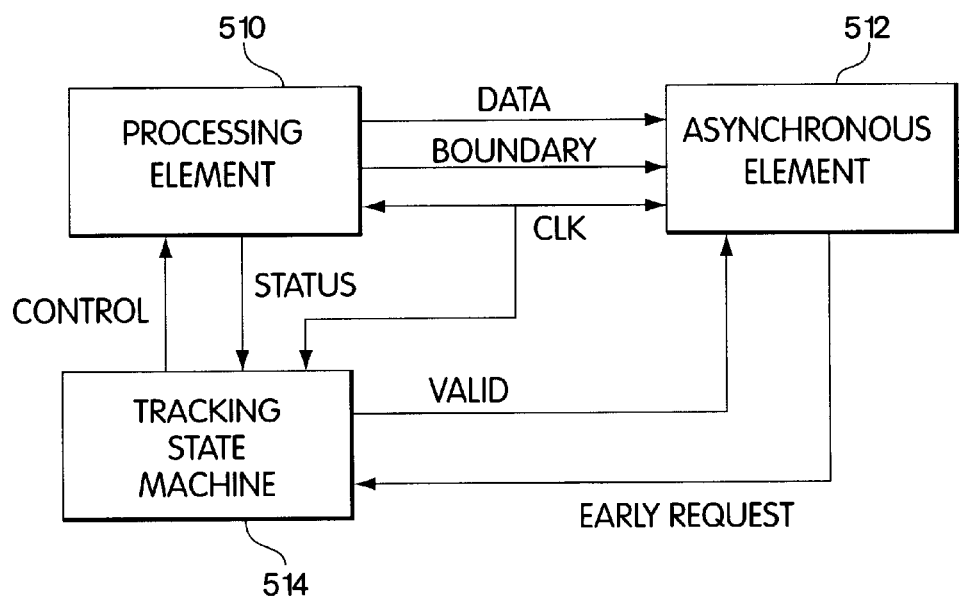
FIG. 11 illustrates the connection of a processing element to a processing element having an interface in accordance with the present invention using a tracking state machine.

FIG. 11 shows a similar construction for connecting an arbitrary processing element 510 to an asynchronous processing element using an interface of the present invention illustrated at 512. Similarly, this construction also uses a tracking state machine 514 which provides control inputs to and receives status information from the processing element 510. It outputs a valid data signal to the asynchronous element 512 and receives a request signal. The request signal is the input to the input control logic of the asynchronous element 512. The processing element 510 should have the same characteristics as processing element 502, i.e., such that it outputs the video data and boundary signal to the asynchronous element 512 and has appropriate status information to enable determination of whether output data is valid and appropriate control inputs to enable to stopping and starting the processing of the element by the tracking state machine 514. The tracking state machine is a copy of the input control logic, such as shown in FIG. 7C, but without latches for capturing the video data. The clock signal shown in FIG. 11 may be generated by the sender of the data. The request signal also may be accompanied by its own clock signal.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A system for processing media data, comprising:
   a media processing element having a first input for receiving media data comprised of a plurality of media samples, a second input for receiving first control information indicating how the received media data is to be processed, a third input for receiving a control signal for starting and stalling processing by the media processing element and an output providing processed data; and
   a counting module having a first input for receiving a value to be loaded to provide an output, wherein the output indicates a number of samples of the received media data for which the first control information is valid, and control logic for tracking a number of media samples processed by the media processing element and for asserting the control signal to stall processing by the media processing element after the media processing element outputs the last sample for which the first control information is valid.

2. The system of claim 1, wherein the media processing element includes a plurality of interconnected media processors.

3. A system for processing media data, comprising:
   a first media processing element having a first input for receiving data comprised of a plurality of media samples, a second input for receiving first control information indicating how the received media data is to be processed, a third input for receiving a control signal for starting and stopping processing by the first media processing element and an output providing first processed media data;
   a second media processing element having a first input connected to the output of the first media processing element and for receiving the first processed media data comprised of a plurality of media samples, a second input for receiving second control information indicating how the received first processed media data is to be processed, a third input for receiving the control signal for starting and stopping processing by the second media processing element and an output providing second processed media data; and
   a counting module having a first input for receiving a value to be loaded to provide an output, wherein the output indicates a number of media samples of the second processed media data for which the second control information is valid, and control logic for tracking a number of media samples processed by the second media processing element and for generating the control signal to the first and second media processing elements after the second media processing element outputs the last media sample for which the second control information is valid.

4. The system of claim 1, wherein the media processing element includes an output interface, comprising:

an output, including data lines for carrying a media datum and a boundary signal line for carrying a signal indicating whether the media datum defines a boundary of a sample of media data;

a valid data signal output line for carrying a valid data signal and associated with a media datum and indicating whether the associated media datum is valid;

a request signal input line for carrying a request signal from a receiver and associated with a media datum from the media processing element and indicating a request for transfer of the associated media datum; and means for holding a media datum at the output when either of the request signal or valid data signal associated with the media datum are not asserted and for permitting transfer of the media datum to the receiver through the output when both the request signal and the valid data signal associated with the media datum are asserted.

5. The system of claim 4, wherein the means for holding and permitting transfer includes means for holding the media datum on the output when either of the request signal or valid data signal are not asserted and for permitting update of the media datum on the output when both the request signal and the valid data signal are asserted.

6. The system of claim 1, wherein the media processing element has an input interface, comprising:

an input, including data lines for carrying a media datum and a boundary signal line for carrying a signal indicating whether the media datum on the data lines defines a boundary of a sample of media data;

a valid data signal input line for carrying a valid data signal associated with a media datum from a sender and indicating whether the associated media datum is valid;

a request signal output line for carrying a request signal and associated with a media datum from the sender and indicating a request for transfer of the associated media datum; and means for accepting a media datum received through the input when both the request signal and the valid data signal associated with the media datum are asserted and for not accepting a media datum received through the input when either the request signal or the valid data signal associated with the media datum are not asserted.

7. The system of claim 6, wherein the means for accepting and not accepting a media datum includes means for not reading the media datum on the input when either of the request signal or valid data signal are not asserted and for reading the media datum on the input when both the request signal and the valid data signal are asserted.

8. The system of claim 1, wherein the media processing element further comprises:

(a) an input interface having:
 (i) an input, including data lines for carrying a media datum and a boundary signal line for carrying a first boundary signal indicating whether the media datum on the data lines defines a boundary of a sample of media data;
 (ii) a valid data signal input line for carrying a first valid data signal associated with a media datum from a sender and indicating whether the associated media datum is valid;
 (iii) a request signal output line for carrying a first request signal and associated with a media datum from the sender and indicating a request for transfer of the associated media datum; and
 (iv) an output connected to the input of the media processing element;

(b) input logic for accepting a media datum received through the input when both the first request signal and the first valid data signal associated with the media datum are asserted and for not accepting a media datum received through the input when either the request signal or the valid data signal associated with the media datum are not asserted; and (c) an output interface having:
 (i) an output, including data lines for carrying a media datum and a boundary signal line for carrying a second boundary signal indicating whether the media datum defines a boundary of a sample of media data;
 (ii) a valid data signal output line for carrying a second valid data signal and associated with a media datum and indicating whether the associated media datum is valid;
 (iii) a request signal input line for carrying a second request signal from a receiver and associated with a media datum from the media processing element and indicating a request for transfer of the associated media datum; and
 (iv) an input connected to the output of the media processing element; and (d) output logic for holding a media datum when either of the second request signal or second valid data signal associated with the media datum are not asserted and for permitting transfer of the media datum to the receiver through the output when both the second request signal and the second valid data signal associated with the media datum are asserted.

9. The system of claim 3, wherein one of the first and second media processing elements includes an output interface, comprising:

an output, including data lines for carrying a media datum and a boundary signal line for carrying a signal indicating whether the media datum defines a boundary of a sample of media data;

a valid data signal output line for carrying a valid data signal and associated with a media datum and indicating whether the associated media datum is valid;

a request signal input line for carrying a request signal from a receiver and associated with a media datum from the media processing element and indicating a request for transfer of the associated media datum; and means for holding a media datum at the output when either of the request signal or valid data signal associated with the media datum are not asserted and for permitting transfer of the media datum to the receiver through the output when both the request signal and the valid data signal associated with the media datum are asserted.

10. The system of claim 9, wherein the means for holding and permitting transfer includes means for holding the media datum on the output when either of the request signal or valid data signal are not asserted and for permitting update of the media datum on the output when both the request signal and the valid data signal are asserted.

11. The system of claim 3, wherein one of the first and second media processing elements includes an input interface, comprising:

an input, including data lines for carrying a media datum and a boundary signal line for carrying a signal indicating whether the media datum on the data lines defines a boundary of a sample of media data;

a valid data signal input line for carrying a valid data signal associated with a media datum from a sender and indicating whether the associated media datum is valid;

a request signal output line for carrying a request signal and associated with a media datum from the sender and indicating a request for transfer of the associated media datum; and means for accepting a media datum received through the input when both the request signal and the valid data signal associated with the media datum are asserted and for not accepting a media datum received through the input when either the request signal or the valid data signal associated with the media datum are not asserted.

12. The system of claim 11, wherein the means for accepting and not accepting a media datum includes means for not reading the media datum on the input when either of the request signal or valid data signal are not asserted and for reading the media datum on the input when both the request signal and the valid data signal are asserted.

13. The system of claim 3, wherein one of the first and second media processing elements comprises:

(a) an input interface having:
 (i) an input, including data lines for carrying a media datum and a boundary signal line for carrying a first boundary signal indicating whether the media datum on the data lines defines a boundary of a sample of media data;
 (ii) a valid data signal input line for carrying a first valid data signal associated with a media datum from a sender and indicating whether the associated media datum is valid;
 (iii) a request signal output line for carrying a first request signal and associated with a media datum from the sender and indicating a request for transfer of the associated media datum; and
 (iv) an output connected to the first input of the media processing element;

(b) input logic for accepting a media datum received through the input when both the first request signal and the first valid data signal associated with the media datum are asserted and for not accepting a media datum received through the input when either the request signal or the valid data signal associated with the media datum are not asserted; and (c) an output interface having:
 (i) an output, including data lines for carrying a media datum and a boundary signal line for carrying a second boundary signal indicating whether the media datum defines a boundary of a sample of media data;
 (ii) a valid data signal output line for carrying a second valid data signal and associated with a media datum and indicating whether the associated media datum is valid;
 (iii) a request signal input line for carrying a second request signal from a receiver and associated with a media datum from the media processing element and indicating a request for transfer of the associated media datum; and
 (iv) an input connected to the output of the media processing element; and (d) output logic for holding a media datum when either of the second request signal or second valid data signal associated with the media datum are not asserted and for permitting transfer of the media datum to the receiver through the output when both the second request signal and the second valid data signal associated with the media datum are asserted.

14. The system of claim 1, wherein the media processing element remains stalled until second control information indicating how the received media data is to be processed is received at the second input.

15. The system of claim 14, wherein the media processing element restarts processing the media data in accordance with the second control information.

16. The system of claim 15, wherein the counting module is operative to receive a second count number, and wherein the control logic is operative to control the media processing module to process the received media data in accordance with the second control information until a number of samples of the received media data equal to the second count number have been processed.

17. The system of claim 1, wherein the plurality of media samples form a temporal sequence of media data, and the media processing element performs a function having parameters that are updated for one or more media samples of the temporal sequence.

18. The system of claim 1, wherein the media data includes one or more boundary signals, each boundary signal indicating a boundary of a sample of media data, and wherein the media processing module further includes a second output to assert the boundary signals, and wherein the counting module includes a second input to receive the boundary signals from the media processing module and from which the control logic tracks the number of media samples.

19. The system of claim 3, wherein the first media processing element remains stalled until third control information indicating how the received media data is to be processed is received at the second input of the first media processing element, and wherein the second media processing element remains stalled until fourth control information indicating how the received media data is to be processed is received at the second input of the second media processing element.

20. The system of claim 19, wherein the first and second media processing elements restart processing the media data in accordance with the third and fourth control information, respectively.

21. The system of claim 20, wherein the counting module is operative to receive a second count number, and wherein the control logic is operative to control the first and second media processing module to process the received media data in accordance with the third and fourth control information, respectively, until a number of samples of the received media data equal to the second count number have been processed by the second media processing module.

22. The system of claim 3, wherein the plurality of media samples form a temporal sequence of media data, and the first media processing element performs a function having parameters that are updated for one or more media samples of the temporal sequence.

23. The system of claim 22, wherein the second media processing element performs a second function having parameters that are updated for one or more media samples of the temporal sequence.

24. The system of claim 3, wherein the received media data includes one or more boundary signals, each boundary signal indicating a boundary of a sample of received media data, and wherein the second media processing module further includes a second output to assert the boundary signals, and wherein the counting module includes a second input to receive the boundary signals from the second media processing module and from which the control logic tracks the number of media samples.

25. A method of processing media data, comprising:

receiving media data comprising a plurality of media samples;

receiving first control information indicating how the media data is to be processed;

receiving a first count number indicating a number of samples of the media data for which the control information is valid;

processing the received media data in accordance with the first control information;

tracking a number of samples processed; and stalling the processing of the media data after a number of media samples equal to the first count number have been processed.

26. The method of claim 25, further comprising:

sending a boundary signal to a receiver indicating whether a media datum of the processed media data defines a boundary of a media sample of the processed media data;

sending a valid media data signal associated with a media datum of the processed media data to the receiver and indicating whether the media datum is valid;

receiving a request signal from the receiver, the request signal associated with a media datum of the processed media data and indicating a request for transfer of the media datum to the receiver;

holding a first media datum of the processed media data if either of the request signal or valid media data signal associated with the first media datum are not asserted; and permitting transfer of the first media datum to the receiver if both the request signal and the valid media data signal associated with the first media datum are asserted.

27. The method of claim 25, further comprising:

receiving a boundary signal from a sender indicating whether a media datum of the received media data defines a boundary of a media sample of the received media data;

receiving a valid media data signal associated with a media datum of the received media data from the sender and indicating whether the media datum is valid;

sending a request signal to the sender, the request signal associated with a media datum of the received media data and indicating a request for transfer of the media datum from the sender;

accepting a first media datum of the received media data if both the request signal and the valid media data signal associated with the first media datum are asserted; and declining to accept the first media datum received if either the request signal or the valid media data signal associated with the first media datum are not asserted.

28. The method of claim 25, further comprising:

stalling the media processing until second control information indicating how the received media data is to be processed is received.

29. The method of claim 28, further comprising:

receiving the second control information; and in response to receiving the second control information, restarting processing the media data in accordance with the second control information.

30. The method of claim 29, further comprising:

receiving a second count number; and processing the received media data in accordance with the second control information until a number of samples of the received media data equal to the second count number have been processed.

31. The method of claim 25, wherein the plurality of media samples form a temporal sequence of media data, and wherein the step of processing the received media data in accordance with the first control information includes performing a function having parameters, wherein the performance of the function includes updating the parameters of the function for one or more media samples of the temporal sequence.

32. The method of claim 25, further comprising:

receiving one or more boundary signals, each boundary signal indicating a boundary of a sample of the media data from which the number of media samples is tracked.

33. A method of processing media data, comprising:

receiving media data comprised of a plurality of media samples;

receiving first control information indicating how the received media data is to be processed;

receiving second control information indicating how a first processed media data is to be processed;

receiving a first count number indicating a number of media samples of the first processed media data for which the second control information is valid;

processing the received media data in accordance with the first control information to produce the first processed media data;

processing the first processed media data in accordance with the second control information to produce second processed media data;

tracking a number of second processed media samples of the second processed media data; and stalling the processing of the received media data and the processing of the first processed media data when the number of tracked media samples equals the first count number.

34. The method of claim 33, further comprising:

sending a boundary signal to a receiver indicating whether a media datum of the second processed media data defines a boundary of a media sample of the second processed media data;

sending a valid media data signal associated with a media datum of the processed media data to the receiver and indicating whether the media datum is valid;

receiving a request signal from the receiver, the request signal associated with a media datum of the processed media data and indicating a request for transfer of the media datum to the receiver;

holding a first media datum of the processed media data if either of the request signal or valid media data signal associated with the first media datum are not asserted; and permitting transfer of the first media datum to the receiver if both the request signal and the valid media data signal associated with the first media datum are asserted.

35. The method of claim 33, further comprising:

receiving a boundary signal from a sender indicating whether a media datum of the received media data defines a boundary of a media sample of the received media data;

receiving a valid media data signal associated with a media datum of the received media data from the sender and indicating whether the media datum is valid;

sending a request signal to the sender, the request signal associated with a media datum of the received media data and indicating a request for transfer of the media datum from the sender;

accepting a first media datum of the received media data if both the request signal and the valid media data signal associated with the first media datum are asserted; and declining to accept the first media datum received if either the request signal or the valid media data signal associated with the first media datum are not asserted.

36. The method of claim 33, further comprising:

stalling processing the received media data and the first processed media data until third control information indicating how the received media data is to be processed is received and fourth control information indicating how the first processed media data is to be processed is received.

37. The method of claim 36, further comprising:

receiving the third and fourth control information; and in response to receiving the third and fourth control information, restarting processing the received media data in accordance with the third control information.

38. The method of claim 37, further comprising:

in response to receiving the third and fourth control information, restarting processing the first processed media data in accordance with the fourth control information.

39. The method of claim 38, further comprising:

receiving a second count number; and processing the first processed media data in accordance with the third control information and the first processed media data in accordance with the fourth control information until a number of samples of the first processed media data equal to the second count number have been processed.

40. The method of claim 33, wherein the plurality of received media samples form a first temporal sequence of media data, and wherein the step of processing the received media data in accordance with the first control information includes performing a first function having parameters, wherein the performance of the first function includes updating the parameters of the first function for one or more received media samples of the first temporal sequence.

41. The method of claim 40, wherein a plurality of first processed media samples form a second temporal sequence of media data, and wherein the step of processing the first processed media data in accordance with the second control information includes performing a second function having parameters, wherein the performance of the second function includes updating the parameters of the second function for one or more first processed media samples of the second temporal sequence.

42. The method of claim 33, further comprising:

receiving one or more boundary signals, each boundary signal indicating a boundary of a sample of the received media data from which the number second processed media samples is tracked.

43. A system for processing media data on a computer-readable medium, comprising:

means for receiving media data comprising a plurality of media samples;

means for receiving first control information indicating how the media data is to be processed;

means for receiving a first count number indicating a number of samples of the media data for which the control information is valid;

means for processing the received media data in accordance with the first control information;

means for tracking a number of samples processed; and means for stalling the means for processing after a number of media samples equal to the first count number have been processed.

44. The system of claim 43, further comprising:

means for sending a boundary signal to a receiver indicating whether a media datum of the received media data defines a boundary of a media sample of the received media data;

means for sending a valid media data signal associated with a media datum of the processed media data to the receiver and indicating whether the media datum is valid;

means for receiving a request signal from the receiver, the request signal associated with a media datum of the processed media data and indicating a request for transfer of the media datum to the receiver;

means for holding a first media datum of the processed media data if either of the request signal or valid media data signal associated with the first media datum are not asserted; and means for permitting transfer of the first media datum to the receiver if both the request signal and the valid media data signal associated with the first media datum are asserted.

45. The system of claim 43, further comprising:

means for receiving a boundary signal from a sender indicating whether a media datum of the received media data defines a boundary of a media sample of the received media data;

means for receiving a valid media data signal associated with a media datum of the received media data from the sender and indicating whether the media datum is valid;

means for sending a request signal to the sender, the request signal associated with a media datum of the received media data and indicating a request for transfer of the media datum from the sender;

means for accepting a first media datum of the received media data if both the request signal and the valid media data signal associated with the first media datum are asserted; and means for declining to accept the first media datum received if either the request signal or the valid media data signal associated with the first media datum are not asserted.

46. The system of claim 43, further comprising:

means for stalling the means for processing until second control information indicating how the received media data is to be processed is received.

47. The system of claim 46, further comprising:

means for receiving the second control information; and means for restarting the means for processing in accordance with the second control information.

48. The system of claim 47, further comprising:

means for receiving a second count number; and means for processing the received media data in accordance with the second control information until a number of samples of the received media data equal to the second count number have been processed.

49. The system of claim 43, wherein the plurality of media samples form a temporal sequence of media data, and wherein the means for processing the received media data in accordance with the first control information includes means for performing a function having parameters, wherein the means for performing includes means for updating the parameters of the function for one or more media samples of the temporal sequence.

50. The system of claim 43, further comprising:

means for receiving one or more boundary signals, each boundary signal indicating a boundary of a sample of the media data, wherein the means for tracking is operative to track the number of media samples from the boundary signals.

51. The system for processing media data, comprising:

means for receiving media data comprised of a plurality of media samples;

means for receiving first control information indicating how the received media data is to be processed;

means for receiving second control information indicating how a first processed media data is to be processed;

means for receiving a first count number indicating a number of media samples of the first processed media data for which the second control information is valid;

means for processing the received media data in accordance with the first control information to produce the first processed media data;

means for processing the first processed media data in accordance with the second control information to produce second processed media data;

means for tracking a number of second processed media samples of the second processed media data; and means for stalling the processing of the received media data and the processing of the first processed media data when the number of tracked media samples equals the first count number.

52. The system of claim 51, further comprising:

means for sending a boundary signal to a receiver indicating whether a media datum of the second processed media data defines a boundary of a media sample of the second processed media data;

means for sending a valid media data signal associated with a media datum of the processed media data to the receiver and indicating whether the media datum is valid;

means for receiving a request signal from the receiver, the request signal associated with a media datum of the processed media data and indicating a request for transfer of the media datum to the receiver;

means for holding a first media datum of the processed media data if either of the request signal or valid media data signal associated with the first media datum are not asserted; and means for permitting transfer of the first media datum to the receiver if both the request signal and the valid media data signal associated with the first media datum are asserted.

53. The system of claim 51, further comprising:

means for receiving a boundary signal from a sender indicating whether a media datum of the received media data defines a boundary of a media sample of the received media data;

means for receiving a valid media data signal associated with a media datum of the received media data from the sender and indicating whether the media datum is valid;

means for sending a request signal to the sender, the request signal associated with a media datum of the received media data and indicating a request for transfer of the media datum from the sender;

means for accepting a first media datum of the received media data if both the request signal and the valid media data signal associated with the first media datum are asserted; and means for declining to accept the first media datum received if either the request signal or the valid media data signal associated with the first media datum are not asserted.

54. The system of claim 51, further comprising:

means for stalling processing the received media data and the first processed media data until third control information indicating how the received media data is to be processed is received and fourth control information indicating how the first processed media data is to be processed is received.

55. The system of claim 54, further comprising:

means for receiving the third and fourth control information; and means for, in response to receiving the third and fourth control information, restarting processing the received media data in accordance with the third control information.

56. The system of claim 55, further comprising:

means for, in response to receiving the third and fourth control information, restarting processing the first processed media data in accordance with the fourth control information.

57. The system of claim 56, further comprising:

means for receiving a second count number; and means for processing the first processed media data in accordance with the third control information and the first processed media data in accordance with the fourth control information until a number of samples of the first processed media data equal to the second count number have been processed.

58. The system of claim 57, wherein the plurality of received media samples form a first temporal sequence of media data, and wherein the means for processing the received media data in accordance with the first control information includes means for performing a first function having parameters, wherein the means for performing includes means for updating the parameters of the first function for one or more received media samples of the first temporal sequence.

59. The system of claim 58, wherein a plurality of first processed media samples form a second temporal sequence of media data, and wherein the means for processing the first processed media data in accordance with the second control information includes means for performing a second function having parameters, wherein the means for performing the second function includes means for updating the parameters of the second function for one or more first processed media samples of the second temporal sequence.

60. The system of claim 51, further comprising:

means for receiving one or more boundary signals, each boundary signal indicating a boundary of a sample of the received media data from which the number second processed media samples is tracked.

* * * * *